(12) United States Patent
Kotooka et al.

(10) Patent No.: US 8,829,848 B2
(45) Date of Patent: Sep. 9, 2014

(54) BATTERY CHARGING CONTROL DEVICE AND BATTERY CHARGING CONTROL METHOD FOR ELECTRIC VEHICLE

(75) Inventors: Seijiro Kotooka, Isehara (JP); Hideo Nakamura, Yokohama (JP); Satoshi Segawa, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 377 days.

(21) Appl. No.: 13/263,921

(22) PCT Filed: May 6, 2010

(86) PCT No.: PCT/JP2010/058073
§ 371 (c)(1),
(2), (4) Date: Oct. 11, 2011

(87) PCT Pub. No.: WO2010/137462
PCT Pub. Date: Dec. 2, 2010

(65) Prior Publication Data
US 2012/0032637 A1 Feb. 9, 2012

(30) Foreign Application Priority Data

May 27, 2009 (JP) ................................ 2009-127110

(51) Int. Cl.
| | | |
|---|---|---|
| H02J 7/14 | (2006.01) | |
| B60L 11/00 | (2006.01) | |
| B60W 10/24 | (2006.01) | |
| B60K 16/00 | (2006.01) | |
| B60L 11/18 | (2006.01) | |
| B60W 10/26 | (2006.01) | |
| B60K 6/46 | (2007.10) | |
| B60W 20/00 | (2006.01) | |
| B60L 11/12 | (2006.01) | |
| B60W 10/08 | (2006.01) | |
| B60W 10/06 | (2006.01) | |

(52) U.S. Cl.
CPC .............. *B60K 6/46* (2013.01); *B60W 2540/10* (2013.01); *B60L 11/1861* (2013.01); *Y02T 10/7088* (2013.01); *B60W 2520/10* (2013.01); *Y02T 90/14* (2013.01); *B60L 2240/62* (2013.01); *Y02T 10/7077* (2013.01); *B60W 10/26* (2013.01); *Y02T 10/6286* (2013.01); *Y02T 90/128* (2013.01); *B60L 11/185* (2013.01); *Y02T 10/7291* (2013.01); *Y02T 10/7044* (2013.01); *Y02T 90/16* (2013.01); *B60W 2510/244* (2013.01); *Y02T 10/705* (2013.01); *B60W 2710/086* (2013.01); *B60W 20/00* (2013.01); *B60W 2550/143* (2013.01); *Y02T 10/7005* (2013.01); *B60L 11/123* (2013.01); *Y02T 10/6269* (2013.01); *B60W 10/08* (2013.01); *B60L 2240/64* (2013.01); *B60W 2550/402* (2013.01); *B60W 2710/083* (2013.01); *B60W 10/06* (2013.01); *Y02T 10/642* (2013.01); *Y02T 10/6217* (2013.01); *B60L 2240/423* (2013.01); *Y02T 90/162* (2013.01); *B60W 2710/0666* (2013.01)
USPC .......... 320/104; 320/109; 701/22; 180/65.29; 180/65.31

(58) Field of Classification Search
USPC ........ 320/104, 109; 701/22; 180/65.29, 65.31
See application file for complete search history.

(56) References Cited

U.S. PATENT DOCUMENTS

| | | | | |
|---|---|---|---|---|
| 5,343,970 | A * | 9/1994 | Severinsky | 180/65.25 |
| 5,832,396 | A * | 11/1998 | Moroto et al. | 701/22 |
| 5,892,346 | A * | 4/1999 | Moroto et al. | 318/587 |
| 6,202,024 | B1 * | 3/2001 | Yokoyama et al. | 701/420 |
| 8,084,991 | B2 * | 12/2011 | Yoda et al. | 320/108 |
| 8,344,688 | B2 * | 1/2013 | Yoda et al. | 320/107 |
| 2002/0188387 | A1 | 12/2002 | Woestman et al. | |
| 2009/0024266 | A1 * | 1/2009 | Bertness et al. | 701/22 |
| 2009/0278666 | A1 * | 11/2009 | Yoda et al. | 340/10.34 |

FOREIGN PATENT DOCUMENTS

| | | |
|---|---|---|
| JP | 2002-36903 A | 2/2002 |
| JP | 3417389 B2 | 4/2003 |
| JP | 2003-235106 A | 8/2003 |
| JP | 2005-160269 A | 6/2005 |
| RU | 2 312 432 C2 | 12/2007 |

OTHER PUBLICATIONS

Chinese Office Action dated Aug. 12, 2013; (5 pages).

* cited by examiner

*Primary Examiner* — M'Baye Diao
(74) *Attorney, Agent, or Firm* — Foley & Lardner LLP

(57) ABSTRACT

A battery charging control device for controlling a power generation device installed in an electric vehicle sets a battery energy management area using a current position of a host vehicle as a reference, detects at least one travelable route within the battery energy management area, calculates a battery energy management upper limit value and a battery energy management lower limit value on the basis of a maximum value and a minimum value of energy values required to travel to respective points on the travelable route from the current position, and calculates a battery energy management width by subtracting the management lower limit value from the management upper limit value. When the battery energy management width is not within a predetermined range, the battery energy management area is modified so as to enter the predetermined range. As a result, battery charging is controlled such that a magnitude relationship between the battery energy management upper limit value and the battery energy management lower limit value does not reverse.

6 Claims, 26 Drawing Sheets

ROAD INFORMATION ARRAY DATA

| TYPE OF INFORMATION POINT | A: LONGITUDE | B: LATITUDE | C: ALTITUDE | D: ROAD TYPE |
|---|---|---|---|---|
| 1 | DAT_A(1) | DAT_B(1) | DAT_C(1) | DAT_D(1) |
| 2 | DAT_A(2) | DAT_B(2) | DAT_C(2) | DAT_D(2) |
| 3 | DAT_A(3) | DAT_B(3) | DAT_C(3) | DAT_D(3) |
| 4 | DAT_A(4) | DAT_B(4) | DAT_C(4) | DAT_D(4) |
| 5 | DAT_A(5) | DAT_B(5) | DAT_C(5) | DAT_D(5) |
| . | . | . | . | . |
| . | . | . | . | . |
| . | . | . | . | . |
| . | . | . | . | . |
| . | . | . | . | . |
| . | . | . | . | . |
| . | . | . | . | . |
| . | . | . | . | . |
| . | . | . | . | . |
| . | . | . | . | . |

FIG.10

ROAD INFORMATION AND CONTROL PARAMETER ARRAY DATA

| INFORMATION TYPE AND CONTROL PARAMETER / POINT | A: LONGITUDE | B: LATITUDE | C: ALTITUDE | D: ROAD TYPE | E: TRAVEL HISTORY | F: LINEAR DISTANCE FROM HOST VEHICLE POSITION | G: TRAVEL DISTANCE FROM HOST VEHICLE POSITION | H: AVERAGE VEHICLE SPEED | I: TRAVEL ENERGY FROM HOST VEHICLE POSITION |
|---|---|---|---|---|---|---|---|---|---|
| 1 | DAT_A(1) | DAT_B(1) | DAT_C(1) | DAT_D(1) | DAT_E(1) | DAT_F(1) | DAT_G(1) | DAT_H(1) | DAT_I(1) |
| 2 | DAT_A(2) | DAT_B(2) | DAT_C(2) | DAT_D(2) | DAT_E(2) | DAT_F(2) | DAT_G(2) | DAT_H(2) | DAT_I(2) |
| 3 | DAT_A(3) | DAT_B(3) | DAT_C(3) | DAT_D(3) | DAT_E(3) | DAT_F(3) | DAT_G(3) | DAT_H(3) | DAT_I(3) |
| 4 | DAT_A(4) | DAT_B(4) | DAT_C(4) | DAT_D(4) | DAT_E(4) | DAT_F(4) | DAT_G(4) | DAT_H(4) | DAT_I(4) |
| 5 | DAT_A(5) | DAT_B(5) | DAT_C(5) | DAT_D(5) | DAT_E(5) | DAT_F(5) | DAT_G(5) | DAT_H(5) | DAT_I(5) |
| . | . | . | . | . | . | . | . | . | . |

FIG.11

WHEN AREA IS REDUCED

WHEN AREA IS ENLARGED

US 8,829,848 B2

BATTERY CHARGING CONTROL DEVICE AND BATTERY CHARGING CONTROL METHOD FOR ELECTRIC VEHICLE

TECHNICAL FIELD

This invention relates to a device and a method for controlling charging of a battery installed in an electric vehicle.

BACKGROUND ART

JP3417389B, published by the Japan Patent Office in 2003, discloses a device for controlling a power generation device installed in a hybrid electric vehicle in order to control charging of a battery.

This battery charging control technique uses road information such as a travel route, a travel distance and an altitude obtained from a car navigation system. A battery energy management upper limit value and a battery energy management lower limit value are set such that before a downhill slope, a remaining battery energy is as low as possible and before an uphill slope, the remaining battery energy is as high as possible.

SUMMARY OF THE INVENTION

However, depending on operating conditions of the vehicle, the battery energy management lower limit value may be larger than the upper limit value. In this case, battery charging control cannot be executed.

It is therefore an object of this invention to control charging of a battery such that a magnitude relationship between a battery energy management upper limit value and a battery energy management lower limit value does not reverse.

To achieve this object, a device that controls a power generation device installed in an electric vehicle in order to control charging of a battery according to this invention comprises: a current position detection unit that detects a current position of a host vehicle; a management area setting unit that sets a battery energy management area using the current position as a reference; a road information detection unit that detects at least one travelable route within the battery energy management area; a required travel energy estimation unit that estimates energy values required to travel to respective points on the travelable route from the current position on the basis of information relating to the current position and information relating to the respective points; a maximum/minimum extraction unit that extracts a maximum value and a minimum value from the required travel energy values; a management target calculation unit that calculates a battery energy management upper limit value and a battery energy management lower limit value on the basis of the maximum value and the minimum value of the required travel energy; a battery energy management width calculation unit that calculates a battery energy management width by subtracting the battery energy management lower limit value from the battery energy management upper limit value; a management area modification unit that modifies the battery energy management area when the battery energy management width is not within a predetermined range such that the battery energy management width enters the predetermined range; and a charging control unit that controls the vehicle-installed power generation device such that a remaining battery energy is within the battery management width between the battery energy management upper limit value and the battery energy management lower limit value.

The details as well as other features and advantages of this invention are set forth in the remainder of the description and are shown in the accompanying drawings.

BRIEF DESCRIPTION OF THE DRAWINGS

FIG. 10 is a diagram showing an example of array data stored in a data buffer in a step S1602 of FIG. 7.

FIG. 11 is a diagram showing an example of array data stored in a data buffer in a step S1603 of FIG. 7.

MODE FOR CARRYING OUT THE INVENTION

An embodiment of this invention will be described below with reference to the drawings.

[Power Train]

Figure 1:
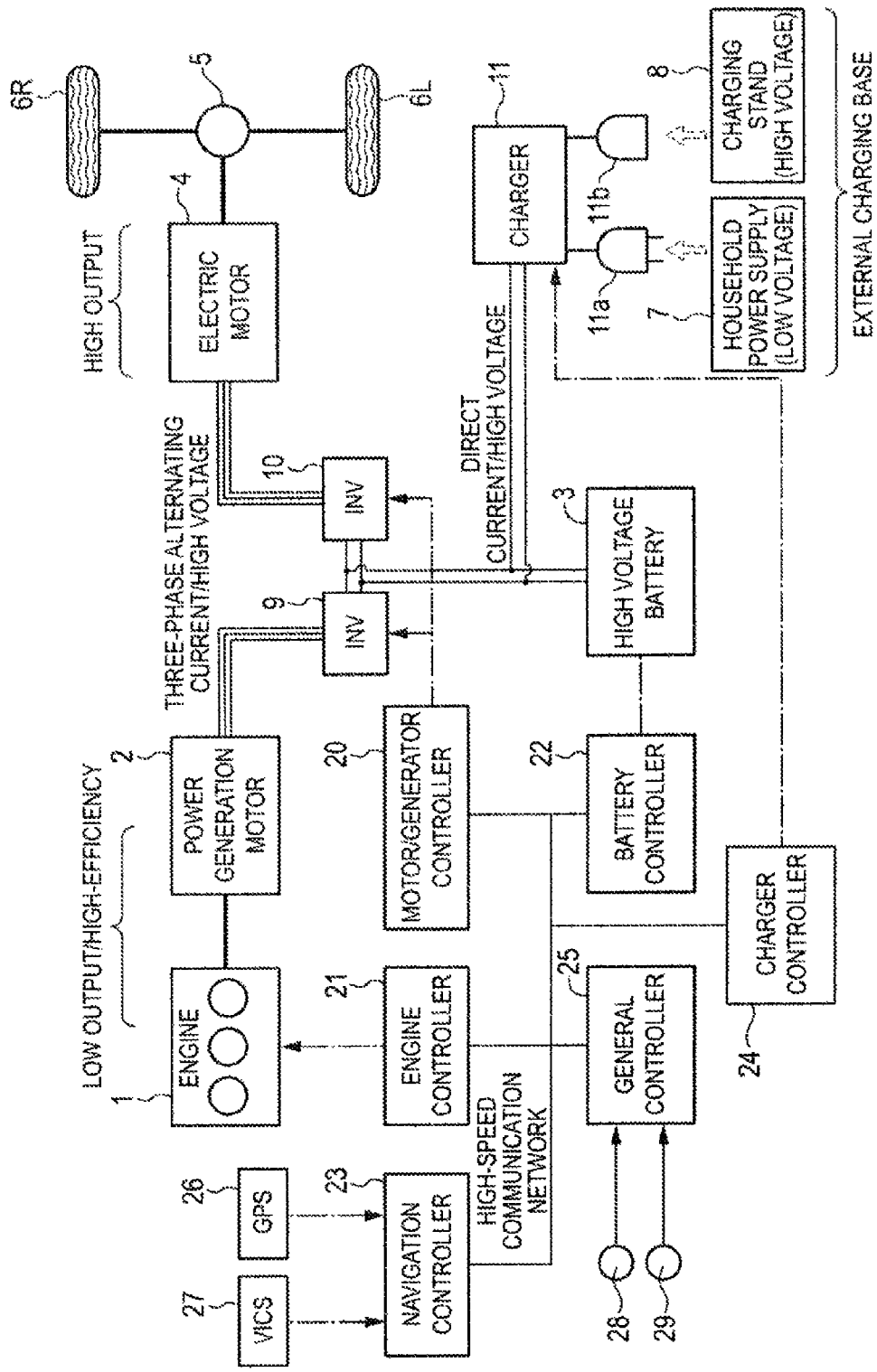
FIG. 1 is a schematic system diagram showing a power train and a control system of a hybrid electric vehicle to which an embodiment of this invention is applied.

FIG. 1 is a schematic system diagram showing a power train and a control system of a hybrid electric vehicle to which this invention is applied.

A hybrid electric vehicle ("HEV" hereafter) shown in FIG. 1 is a series type HEV in which a battery can be charged by an external power supply. It should be noted that this invention may also be applied to a parallel type HEV or a compound type HEV. This invention may also be applied to an HEV that is not charged by an external power supply.

The HEV shown in FIG. 1 includes an engine 1, a power generation motor 2, an inverter 9, a battery 3, an inverter 10, an electric motor 4, a final reduction gear 5, a left drive wheel 6L, a right drive wheel 6R, and a charger 11.

The engine 1 drives the power generation motor 2. The power generation motor 2 generates power when driven by the engine 1. The power generation motor 2 also functions as a starter motor that starts the engine 1 when driven by power from the battery 3. The power generation motor 2 is a high-voltage three-phase motor.

The inverter 9 is connected between the power generation motor 2 and the battery 3. The inverter 9 is an AC/DC converter. When performing AC/DC conversion, the inverter 9 controls power between the power generation motor 2 and the battery 3.

The battery 3 is installed in the HEV. The battery 3 is a high-voltage battery. The battery 3 is charged by power generated by the power generation motor 2. The battery 3 is also charged by power supplied from a household power supply 7 or a charging stand (a commercial facility) 8 serving as an external charging base via the charger 11. The battery 3 supplies power to the electric motor 4 as required.

The inverter 10 is connected between the battery 3 and the electric motor 4. The inverter 10 is an AC/DC converter. When performing AC/DC conversion, the inverter 10 controls power between the battery 3 and the electric motor 4.

The electric motor 4 is a high-voltage three-phase motor. The electric motor 4 generates a driving force using the power supplied from the battery 3. The electric motor 4 drives the left drive wheel 6L and the right drive wheel 6R. The electric motor 4 also has a regenerative braking function for charging the battery 3 by converting a rotational energy of the left drive wheel 6L and the right drive wheel 6R into power when the vehicle decelerates.

The final reduction gear 5 includes a differential gear device. The final reduction gear 5 is disposed between the electric motor 4 and the left and right drive wheels 6L, 6R.

The left drive wheel 6L and right drive wheel 6R are driven by the driving force generated by the electric motor 4.

The charger 11 is connected to the battery 3. The charger 11 includes a plug 11a and a plug 11b. The plug 11a is inserted into the household power supply 7. The plug 11b is inserted into a power supply of the charging stand 8. The household power supply 7 is a low-voltage external power supply. The power supply of the charging stand 8 is a high-voltage external power supply. When the charging stand 8 is used, the battery 3 is charged rapidly.

In this type of HEV, the engine 1 drives the power generation motor 2. As a result, the power generation motor 2 generates power. This power is charged to the battery 3 serving as a vehicle-installed power supply. The charged power is supplied to the electric motor 4 as required. As a result, the electric motor 4 generates driving force. The driving force drives the left drive wheel 6L and the right drive wheel 6R via the final reduction gear 5.

Hence, the engine 1 and the power generation motor 2 constitute a vehicle-installed power generation device according to this invention. The electric motor 4 corresponds to a travel power source according to this invention.

It should be noted that when small devices having a comparatively low output and a comparatively high efficiency are used as the engine 1 and the power generation motor 2 in this embodiment, an improvement in efficiency and a reduction in cost are achieved. Further, when a large motor having a comparatively high output is used as the electric motor 4, an improvement in operability (high response) is achieved.

[Control System]

Next, a vehicle-installed controller that controls the aforesaid power train will be described.

The vehicle-installed controller includes a motor/generator controller 20, an engine controller 21, a battery controller 22, a car navigation controller 23, a charger controller 24, and a general power train controller 25.

The motor/generator controller 20 increases and reduces an input/output torque (a power generation load) of the power generation motor 2 by controlling the inverter 9. The motor/generator controller 20 increases and reduces an input/output torque (a drive load) of the electric motor 4 by controlling the inverter 10.

The engine controller 21 controls an engine output torque by adjusting an intake air amount, an ignition timing, and a fuel injection amount of the engine 1.

The battery controller 22 estimates internal battery state quantities such as a SOC (State of Charge) and a chargeable/dischargeable energy, and performs battery protection.

The car navigation controller 23 detects a position of a host vehicle by receiving a signal (a GPS signal) from a Global Positioning System ("GPS" hereafter) 26. In this regard, the car navigation controller 23 corresponds to a host vehicle position detection unit. The car navigation controller 23 also downloads map data (a road, an altitude, a road gradient, a road curvature, and so on) stored on a medium such as a DVD. The car navigation controller 23 also obtains communication data (congestion information and so on) from a ground traffic infrastructure (for example, a Vehicle Information and Communication System ("VICS" hereafter)) 27. On the basis of this data and information, the car navigation controller 23 searches for a route to a travel destination and guides a driver to the travel destination.

The charger controller 24 controls the charger 11 to execute or stop charging of the battery 3 using power from the household power supply 7 or the charging stand 8.

The general power train controller 25 controls the controllers 20 to 24 in a coordinated fashion to control the electric motor 4 in accordance with a request from the driver and control the engine 1 and the power generation motor 2 while taking both operability and fuel efficiency into account.

[Battery Charging Control]

The controllers 20 to 25 communicate with each other on a high-speed communication network to share various data. The general power train controller 25 controls battery charging by executing control programs shown in FIGS. 2-4 on the basis of these shared data.

Figure 2:
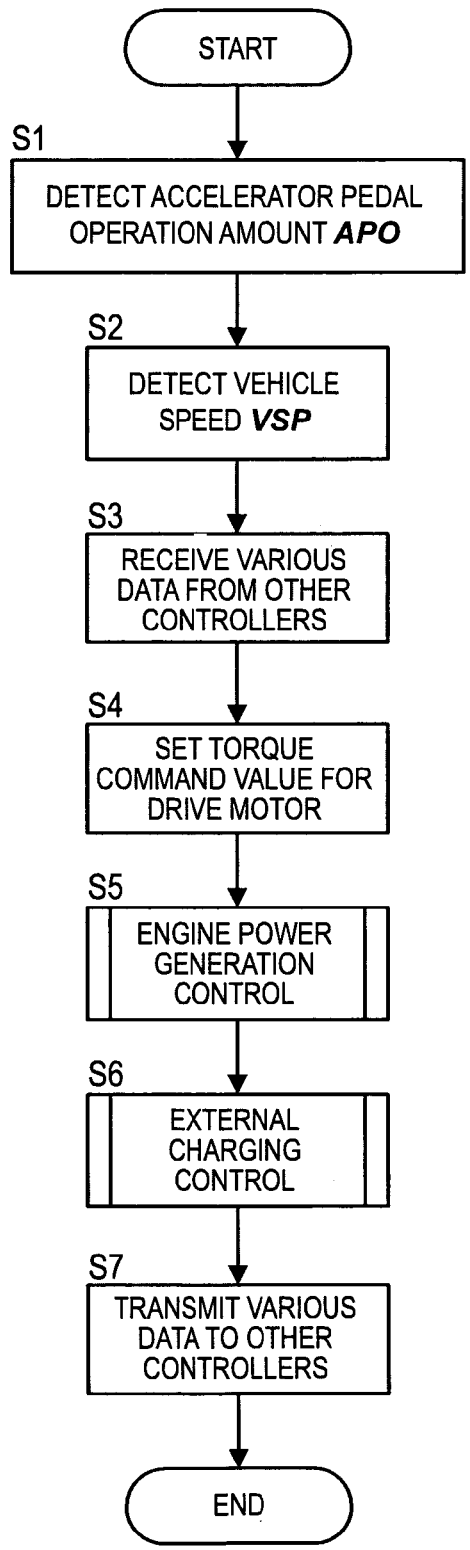
FIG. 2 is a flowchart showing a main routine executed by a general controller.

FIG. 2 is a flowchart showing a main routine executed by the general controller 25. The general controller 25 executes the main routine repeatedly at fixed period intervals.

In a step S1, the controller 25 detects an Accelerator Pedal Operation amount (APO) of the driver. More specifically, the controller 25 detects an accelerator pedal depression stroke on the basis of an output signal from an accelerator operation amount sensor (potentiometer) 28.

In a step S2, the controller 25 detects a vehicle speed VSP. More specifically, the controller 25 detects the vehicle speed VSP on the basis of an output signal from a vehicle wheel speed sensor 29 that generates a pulse signal at a frequency corresponding to a rotation speed of the drive wheels. It should be noted that the vehicle speed VSP may be detected by converting a frequency measured at a different timing into the vehicle speed VSP at a current timing.

In a step S3, the controller 25 reads various data to be described below, which are received from the controllers 20 to 24 via the high-speed communication network, from a reception buffer. More specifically, the controller 25 reads a rotation speed of the power generation motor 2 and a rotation speed of the electric motor 4 from the motor/generator controller 20. Further, the controller 25 reads a start determination flag and an engine rotation speed of the engine 1 from the engine controller 21. Further, the controller 25 reads the state of charge (to be referred to hereafter as a "SOC") of the battery 3 from the battery controller 22. Further, the controller 25 reads a management upper limit value of the battery SOC (to be referred to hereafter as a "SOC upper limit value") and a lower limit value of the battery SOC (to be referred to hereafter as a "SOC lower limit value"), which are determined by the car navigation controller 23 in a manner to be described below. Further, the controller 25 receives information indicating whether or not the household power supply 7 is connected to the charge plug 11a and information indicating whether or not the charging stand 8 is connected to the charge plug 11b from the charging controller 24. When the household power supply 7 is connected to the charge plug 11a, the controller 25 receives charged power information relating to the household power supply 7. When the charging stand 8 is connected to the charge plug 11a, the controller 25 receives charged power information relating to the charging stand 8.

Figure 5:
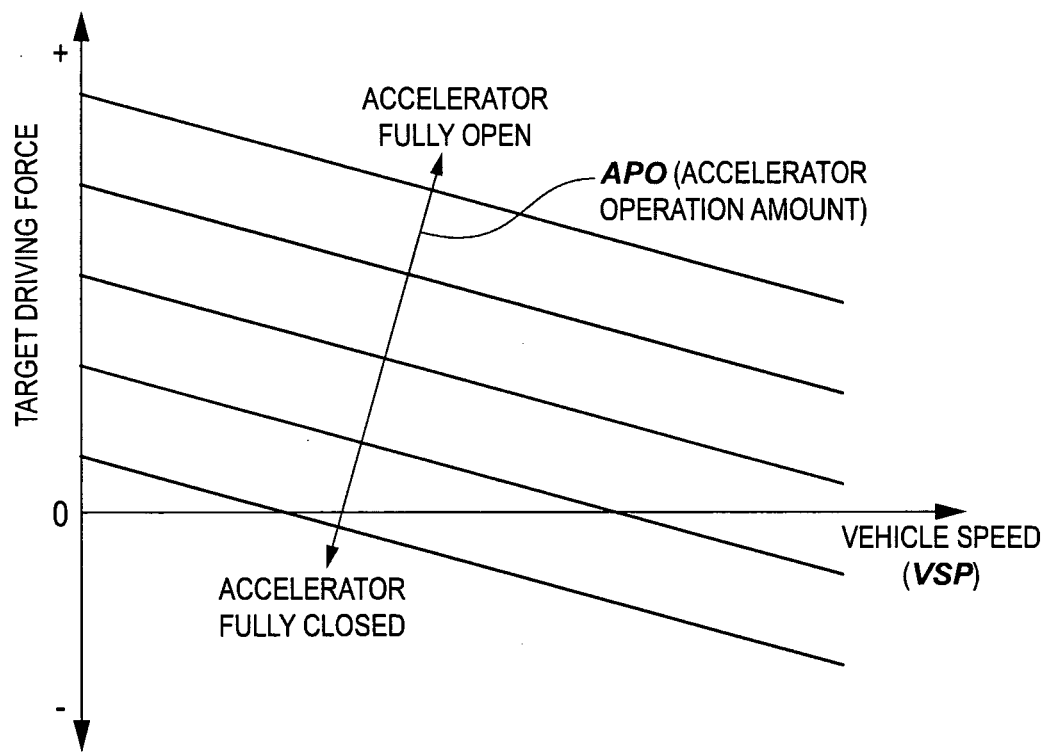
FIG. 5 is a diagram showing an example of a relationship between a vehicle speed, an accelerator pedal operation amount, and a driving force, which is stored by a controller.

In a step S4, the controller 25 sets a torque command value to be applied to the electric motor 4. More specifically, the controller 25 determines a target driving force of the vehicle by applying the accelerator pedal operation amount APO and the vehicle speed VSP to a map shown in FIG. 5, and sets the torque command value of the electric motor 4 by multiplying the target driving force by a constant (effective tire radius/speed reduction ratio). When torque correction is required to suppress knocking vibration caused by torsion in a drive shaft, the torque may be corrected using a known procedure.

In a step S5, the controller 25 executes charging control through engine power generation (to be referred to hereafter as "engine power generation control"). More specifically, the controller 25 calculates a torque command value to be applied to the engine 1 and a power generation load command value to be applied to the power generation motor 2 on the basis of the SOC upper limit value and SOC lower limit value received in the step S3 and the current SOC (to be referred to hereafter as the "actual SOC") of the battery 3. The step S5 corresponds to a charging control unit.

The step S5 will now be described in further detail using FIG. 3.

In a step S51, the controller 25 receives the SOC upper limit value and SOC lower limit value from the car navigation controller 23.

In a step S52, the controller 25 determines whether or not to start power generation. More specifically, the controller 25 decides to start power generation when the actual SOC is smaller than the SOC lower limit value.

In a step S53, the controller 25 determines whether or not to stop power generation. More specifically, the controller 25 decides to stop power generation when the actual SOC is larger than the SOC upper limit value.

In a step S54, the controller 25 determines whether or not power generation is currently underway, or in other words whether or not power generation was underway in a previous calculation period.

In a step S55, the controller 25 sets the engine torque command value and a power generation motor torque command value (power generation load) at zero in order to stop the engine 1 and the power generation motor 2, and then returns the control to a step S6 in FIG. 2.

In a step S56, the controller 25 calculates the power generation motor torque command value (power generation load) by performing a rotation speed feedback control calculation using a rotation speed Ng at which the engine 1 and the power generation motor 2 can generate power efficiently as a target value. Here, the power generation motor torque command value is a power generation load and therefore takes a negative value. The power generation motor 2 generates power for charging the battery 3.

In a step S57, the controller 25 calculates a target engine output on the basis of the SOC upper limit value, the SOC lower limit value, and the actual SOC. The controller 25 then determines an engine torque command value at which the target engine output can be realized at the rotation speed Ng described above, and then returns the control to the step S6 of FIG. 2. It should be noted that the target engine output is substantially equal to the power generation output.

Hence, having determined that power generation is currently underway in the step S54, the controller 25 advances the control to the steps S56 and S57, and having determined that power generation is not underway, the controller 25 advances the control to the step S55. Thus, the controller 25 maintains a current power generation state.

Figure 3:
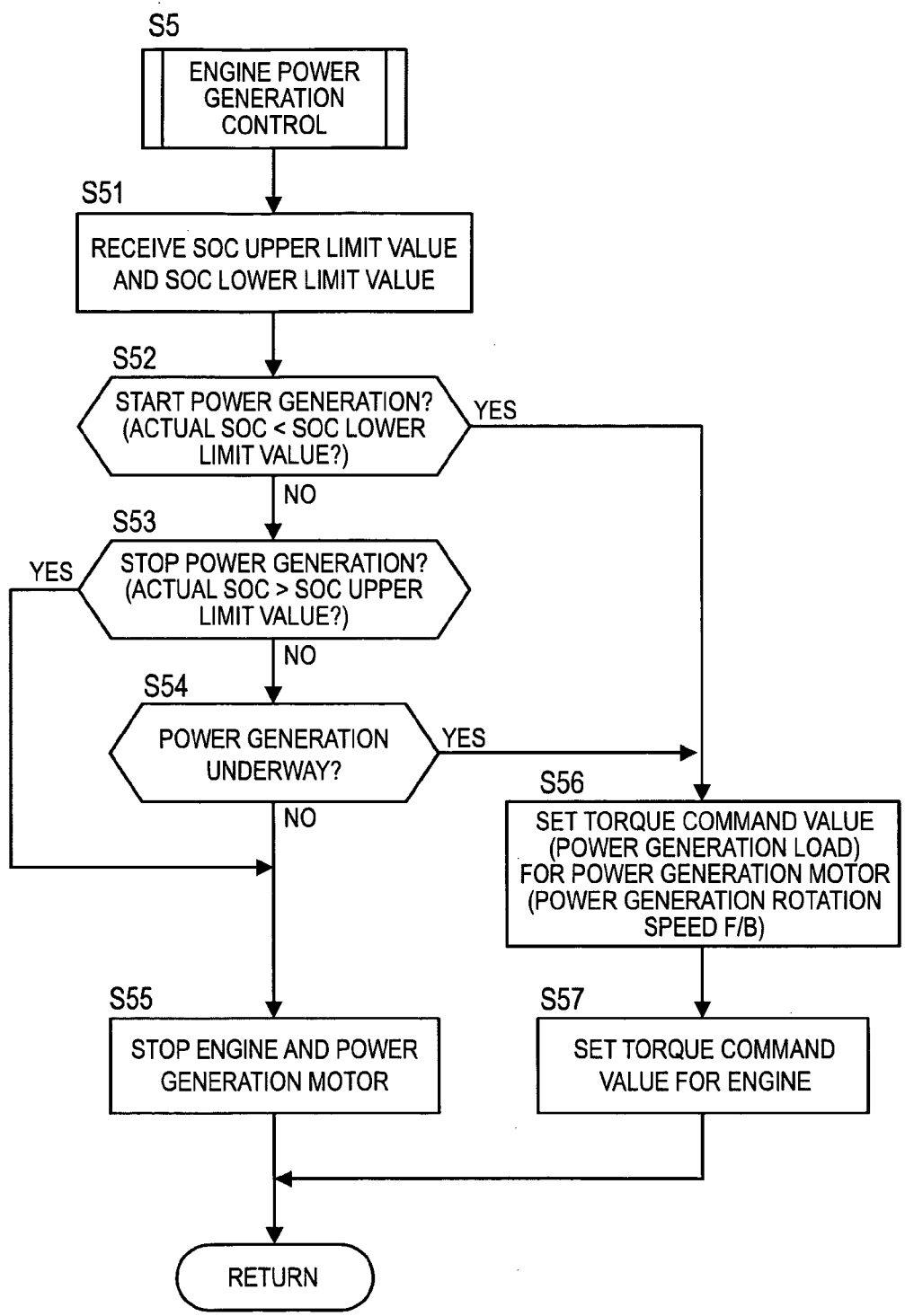
FIG. 3 is a flowchart showing a charging control routine employing power generation by an engine, which is executed by the general controller.

As is evident from the above description, the engine power generation control shown in FIG. 3 is performed to ensure that the actual SOC is smaller than the SOC upper limit value (battery energy management upper limit value) and larger than the SOC lower limit value (battery energy management lower limit value).

Next, external charging control performed in the step S6 of FIG. 2 will be described in detail with reference to FIG. 4.

The external charging control is executed when the battery 3 is charged by power from the exterior of the vehicle, for example the household power supply 7 or the charging stand 8, or in other words power from an external charging base.

In a step S601, the controller 25 determines whether or not the driver has requested external charging. More specifically, the controller 25 may determine whether or not the driver has requested external charging from an external charging switch disposed near a driving seat, or from a car navigation system. When a request has been issued, the controller 25 sets an external charging request flag at one. When a request has not been issued, the controller 25 sets the external charging request flag at zero.

In a step S602, the controller 25 determines whether or not an external charging request has been issued by determining whether or not the external charging request flag is at one. When an external charging request has not been issued, the controller 25 exits the routine of FIG. 4 and returns the control to a step S7 of FIG. 2. When an external charging request has been issued, the controller 25 advances the control to a step S603.

In the step S603, the controller 25 determines whether or not the vehicle is stationary. When the vehicle is not stationary, the controller 25 cannot execute external charging. Therefore, when the vehicle is not stationary, the controller 25 exits the routine of FIG. 4 and returns the control to the step S7 of FIG. 2. When the vehicle is stationary, the controller 25 advances the control to a step S604.

In the step S604, the controller 25 instructs the driver to input a target SOC to be reached at an external charging completion point (to be referred to hereafter as an "external charging completion target SOC"). The driver inputs the external charging completion target SOC by operating a switch disposed near the driving seat or an input device of the car navigation system, for example.

In a step S605, the controller 25 determines whether or not external charging is possible. More specifically, when the household power supply 7 is connected to the external charge plug 11*a*, the controller 25 determines that external charging is possible. Alternatively, when the charging stand 8 is connected to the external charge plug 11*b*, the controller 25 determines that external charging is possible. The controller 25 waits until external charging is possible, and when external charging has become possible advances the control to a step S606.

In the step S606, the controller 25 determines whether or not the actual SOC has reached the external charging completion target SOC.

In a step S607, the controller 25 sets an external charging execution flag at 1 and continues external charging.

In a step S608, the controller 25 determines whether or not the external charge plug 11*a* or the external charge plug 11*b* is connected. If so, the controller 25 returns the control to the step S606. By performing the processing described above, the external charge plug 11*a* or 11*b* is maintained in a connected state (step S608), and by continuing external charging (step S607), the actual SOC is increased. Once the actual SOC has reached the external charging completion target SOC, the control is advanced from the step S606 to a step S610. When the external charge plug 11*a* or the external charge plug 11*b* is pulled out during external charging such that the connection is terminated, the controller 25 advances the control to a step S609.

In the step S609, the controller 25 informs the driver that the external charge plug 11*a* or the external charge plug 11*b* has been pulled out, thereby interrupting external charging. The driver may be informed of the interruption of external charging by displaying information on a screen of the car navigation system. Alternatively, a voice message may be issued.

In the step S610, the controller 25 informs the driver that the actual SOC has reached the external charging completion target SOC, thereby completing external charging. The driver may be informed of the completion of external charging by displaying information on the screen of the car navigation system. Alternatively, a voice message may be issued.

In a step S611, the controller 25 resets the external charging execution flag at zero in order to stop the external charging, and then returns the control to the step S7 of FIG. 2.

Figure 4:
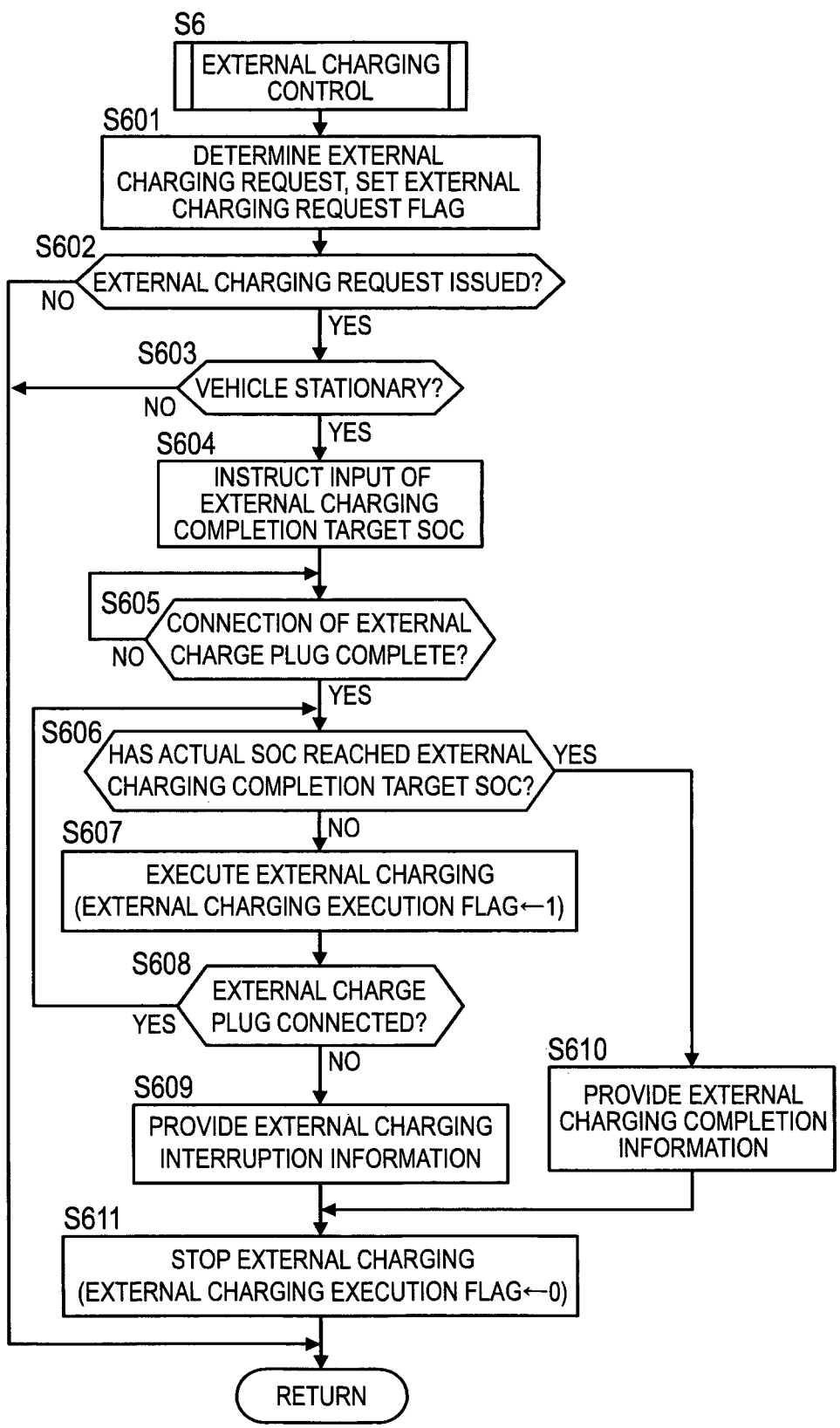
FIG. 4 is a flowchart showing an external charging control routine executed by the general controller.

Returning to FIG. 2, in the step S7, the controller 25 transmits the external charging execution flag set/reset in the steps S607 and S611 of FIG. 4, the engine torque command value determined in the steps S55 and S57 of FIG. 3, the power generation motor torque command value determined in the steps S55 and S56 of FIG. 3, the electric motor torque command value determined in the step S4 of FIG. 2, and an engine stop/start request flag generated in the steps S55 and S57 of FIG. 3 to the corresponding controllers via the high-speed communication network shown in FIG. 1. The controllers then execute the respective commands.

[SOC Upper Limit Value and SOC Lower Limit Value]

Next, the battery energy management target values (the SOC upper limit value and the SOC lower limit value) received by the general controller 25 in the step S51 of FIG. 3 will be described.

Figure 6:
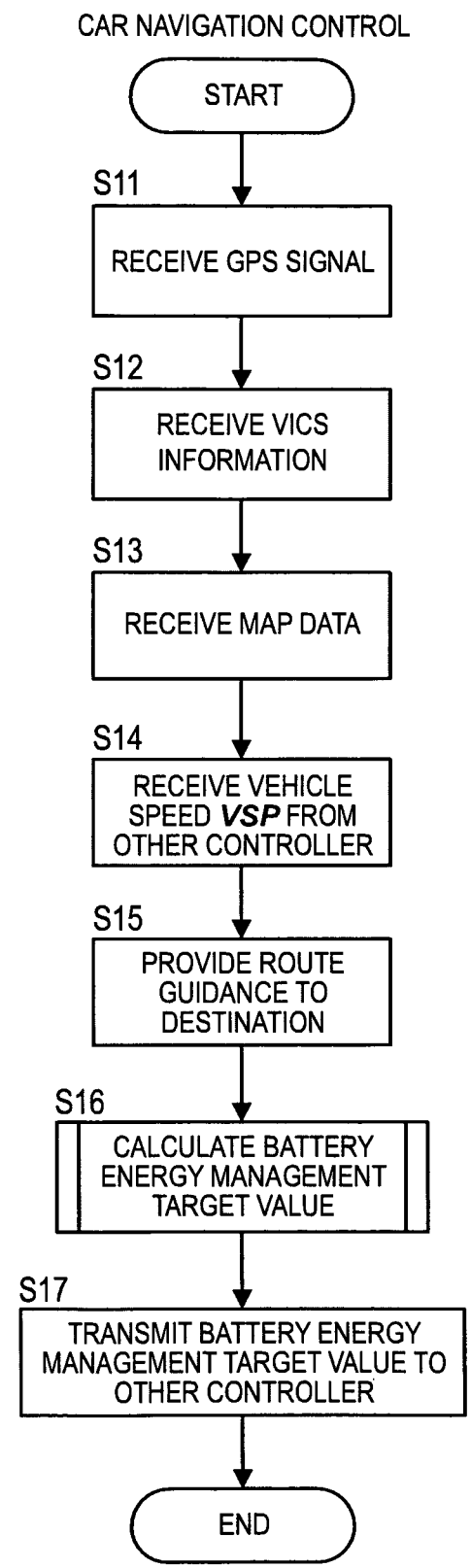
FIG. 6 is a flowchart showing a route guidance control routine executed by a car navigation controller.
Figure 7:
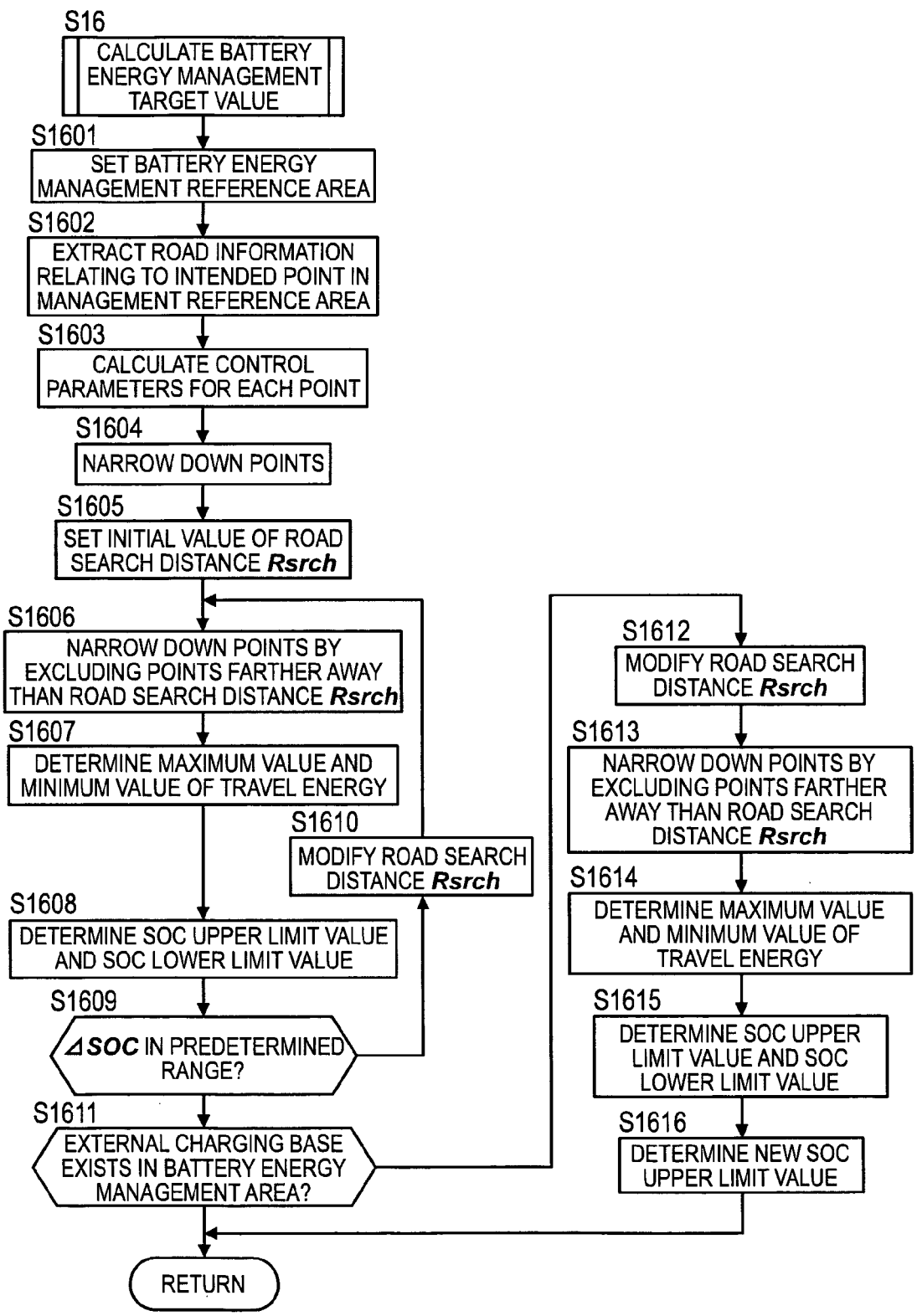
FIG. 7 is a flowchart showing a management target value calculation routine executed by the car navigation controller.

The battery energy management target values (the SOC upper limit value and the SOC lower limit value) are calculated by a calculation program shown in FIG. 7 while the car navigation controller 23 executes car navigation control shown in FIG. 6. In this embodiment, the car navigation controller 23 executes the calculation program, but the car navigation controller 23 does not necessarily have to execute the calculation program, and a controller other than the car navigation controller 23, starting with the general controller 25, may execute the program.

In all cases, the car navigation program shown in FIG. 6 is executed repeatedly at fixed calculation period intervals. Accordingly, a battery energy management target value calculation program shown in FIG. 7 is also executed repeatedly at identical fixed period intervals.

In a step S11, the controller 23 obtains host vehicle position information (longitude, latitude, altitude) and host vehicle advancement direction information on the basis of a GPS signal from a Global Positioning System satellite (to be referred to hereafter as a "GPS satellite") 26.

In a step S12, the controller 23 receives road information such as congestion information relating to the periphery of the host vehicle from the ground traffic infrastructure (VICS, for example) 27, and writes the received information to a reception buffer. It should be noted that the congestion information may be obtained from a system other than VICS.

In a step S13, the controller 23 receives map data (route, altitude, road gradient, road curvature, and so on) relating to roads on the periphery of the host vehicle from a storage medium such as a DVD and writes the received data to the reception buffer.

In a step S14, the controller 23 receives the vehicle speed VSP detected by the general controller 25 in the step S2 of FIG. 2, and writes the received vehicle speed VSP to the reception buffer.

In a step S15, the controller 23 sets a route from a current location of the host vehicle to a destination on the basis of the host vehicle position information (longitude, latitude, altitude), the host vehicle advancement direction information, the map data (route, altitude, road gradient, road curvature, and so on) recorded in the reception buffer, and destination information set by the driver. The controller 23 then guides the driver to travel along the route using images and voice.

The car navigation controller performs route guidance using a technique that is already in practical use, and therefore detailed description of this technique has been omitted.

In a step S16, the controller 23 sets the battery energy management target values (the SOC upper limit value and the SOC lower limit value). The specific content of this setting procedure will be described below.

In a step S17, the controller 23 transmits the battery energy management target values (the SOC upper limit value and the SOC lower limit value) to the general controller 25. As described above, the general controller 25 receives the battery energy management target values (the SOC upper limit value and the SOC lower limit value) in the step S51 of FIG. 3.

FIG. 7 is a flowchart illustrating a routine executed by the controller 23 to set the battery energy management target values (the SOC upper limit value and the SOC lower limit value).

In this embodiment, the battery energy management target values (the SOC upper limit value and the SOC lower limit value) are calculated on the basis of the host vehicle position (longitude, latitude, altitude) information and host vehicle advancement direction (azimuth) information obtained from the GPS signal and the map data (road, altitude, road gradient, road curvature, and so on) recorded in the reception buffer. The specific content of this procedure will now be described.

In a step S1601, the controller 23 sets a road information reference area (battery energy management reference area) that is searched for in order to manage the battery energy on the basis of the host vehicle position information (longitude, latitude, altitude), the host vehicle advancement direction information, and the vehicle speed VSP. The step S1601 corresponds to a management area setting unit.

The battery energy management reference area will be described in detail below. The controller 23 sets the reference area as a maximum road information search area for battery energy management. The controller 23 then sets the SOC upper limit value and the SOC lower limit value while gradually narrowing the search area. Setting the SOC upper limit value and the SOC lower limit value while gradually narrowing the search area is a key point of this embodiment.

It should be noted that in the following description, the battery energy management reference area is circular, but the area does not necessarily have to be circular. Further, the vehicle speed VSP is not limited to a value calculated by the general controller 25, and may be calculated from a temporal rate of change in the host vehicle position information (longitude, latitude) obtained from the GPS signal.

In the step S1601, the controller 23 sets the battery energy management reference area. A specific setting method will now be described with reference to FIG. 8.

Figure 8:
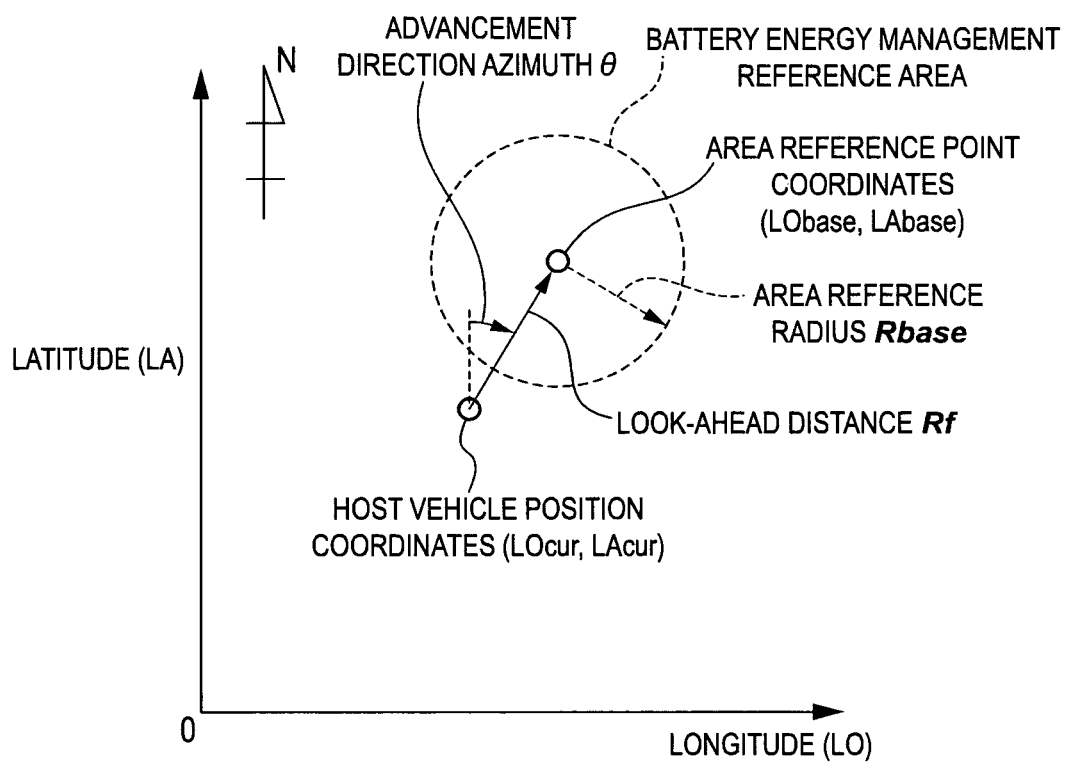
FIG. 8 is a diagram showing an example of a battery energy management reference area.

As shown in FIG. 8, the controller 23 sets an area inside an area reference radius Rbase centering on an area reference point as the battery energy management reference area. The area reference radius Rbase takes an arbitrary predetermined value. Longitude and latitude coordinates (LObase, LAbase) of the area reference point are calculated as follows on the basis of longitude and latitude coordinates (LOcur, LAcur) of the host vehicle, an advancement direction azimuth q of the host vehicle, and a read-ahead distance Rf determined from the vehicle speed VSP.

LObase=LOcur+$Rf$×sin θ

LAbase=LAcur+$Rf$×cos θ

Figure 9:
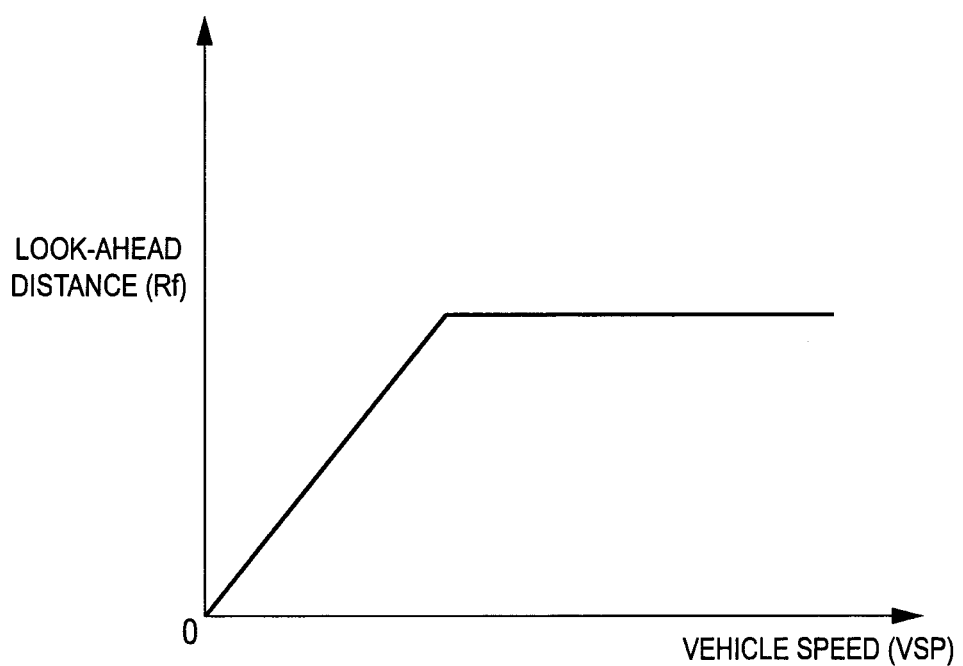
FIG. 9 is a diagram showing an example of a relationship between the vehicle speed and a read-ahead distance, which is stored by the controller.

The read-ahead distance Rf is determined in advance by applying the vehicle speed VSP to a map shown in FIG. 9, for example. As is evident from FIG. 9, when the vehicle speed VSP is lower than a predetermined value, the read-ahead distance Rf increases as the vehicle speed VSP rises. In other words, a point located steadily further from the host vehicle position is set as the area reference point as the vehicle speed increases. When the vehicle speed VSP is higher than a predetermined value, the read-ahead distance Rf remains constant, regardless of the vehicle speed VSP. When the vehicle speed VSP is zero, the host vehicle position and the area reference point match, and therefore the battery energy management reference area is set as a circle having a radius Rbase centering on the host vehicle position.

In a step S1602, the controller 23 compares the battery energy management reference area with the map data (road, altitude, road gradient, road curvature, and so on) stored in the reception buffer. The controller 23 then extracts road information relating to an intended point on at least one travelable route in the battery energy management reference area. The controller 23 then stores the extracted road information in a data buffer. FIG. 10 shows an example of array data corresponding to the stored road information. Four pieces of road information DAT_A (i), DAT_B (i), DAT_C (i), DAT_D (i) indicating A: longitude, B: latitude, C: altitude, and D: road type are stored for each intended point i (i=1, 2, 3, 4, 5 . . . ). With respect to the road type, for example, a narrow road is indicated by a type 0, a regular road is indicated by a type 1, a regional road is indicated by a type 2, and a national road is indicated by a type 3. The step S1602 corresponds to a road information detection unit.

In a step S1603, the controller 23 calculates control parameters including a travel distance and a travel energy from the host vehicle position at each point using the road information extracted in the step S1602, the host vehicle position information, and a known route search function of the car navigation system on the basis of a method to be described below. The controller 23 then adds the calculated control parameters to the array data created in the step S1602 and shown in FIG. 10 and stores the resulting data. The step S1603 corresponds to a required travel energy estimation unit.

FIG. 11 shows an example of the array data. Five control parameters DAT_E (i), DAT_F (i), DAT_G (i), DAT_H (i), DAT_I (i) indicating E: a travel history from the host vehicle position to each point, F: a linear distance from the host vehicle position, G: a travel distance from the host vehicle position to each point, H: an average vehicle speed from the host vehicle position to each point, and I: a travel energy from the host vehicle position are added to the four piece of road information DAT_A (i), DAT_B (i), DAT_C (i), DAT_D (i) described above.

The "travel history from the host vehicle position to each point DAT_E (i)" is obtained on the basis of data recorded in the car navigation controller 23 as the driver actually travels. The car navigation controller 23 sorts the data into three travel history types, namely "no travel history", "low frequency travel history", and "high frequency travel history", for example.

The "linear distance from the host vehicle position to each point DAT_F (i)" is obtained from the point longitude DAT_A (i), the point latitude DAT_B (i), the host vehicle position longitude LOcur, and the host vehicle position latitude LAcur using a following equation.

$$\mathrm{DAT\_}F(i) = \sqrt{(\mathrm{DAT\_}A(i) - \mathrm{LOcur})^2 + (\mathrm{DAT\_}B(i) - \mathrm{LAcur})^2}$$

The "travel distance from the host vehicle position to each point DAT_G (i)" is obtained from a travel distance from the host vehicle position to each point, which is calculated by the car navigation system.

The travel distance from the host vehicle position to each point is calculated using a technique that is well known and established in car navigation systems. Accordingly, detailed description of this technique has been omitted.

The "average vehicle speed from the host vehicle position to each point DAT_H (i)" is obtained by dividing a travel time obtained taking into account congestion information (VICS or the like) by the travel distance DAT_G (i).

The travel time of the travel route is calculated using a technique that is well known and established in car navigation systems. Accordingly, detailed description of this technique has been omitted.

The "travel energy from the host vehicle position to each point DAT_I(i)" is a travel energy consumed when traveling at least one travelable route found during calculation of the "travel distance from the host vehicle position to each point DAT_G(i)".

The travel energy DAT_I (i) is calculated from a vehicle mass M, a gravitational acceleration G, the altitude of each point DAT_C (i), an altitude of the host vehicle position HGTcur, an average running resistance Fres, and the travel distance DAT_G (i) on the basis of a following equation.

$$DAT\_I(i) = M \times G \times (DAT\_C(i) - HGTcur) + Fres \times DAT\_G(i)$$

The right side term "M×G×{DAT_C (i)−HGTcur}" is a travel energy consumed by variation in a positional energy of the host vehicle. Further, the term "Fres×{DAT_G (i)}" is a travel energy consumed to travel against the running resistance.

Hence, the "travel energy from the host vehicle position to each point DAT_I(i)" is expressed by the sum of the travel energy consumed by variation in the positional energy of the host vehicle and the travel energy consumed to travel against the running resistance.

It should be noted that the host vehicle position altitude HGTcur may be obtained on the basis of the GPS signal or the map data.

Figure 12:
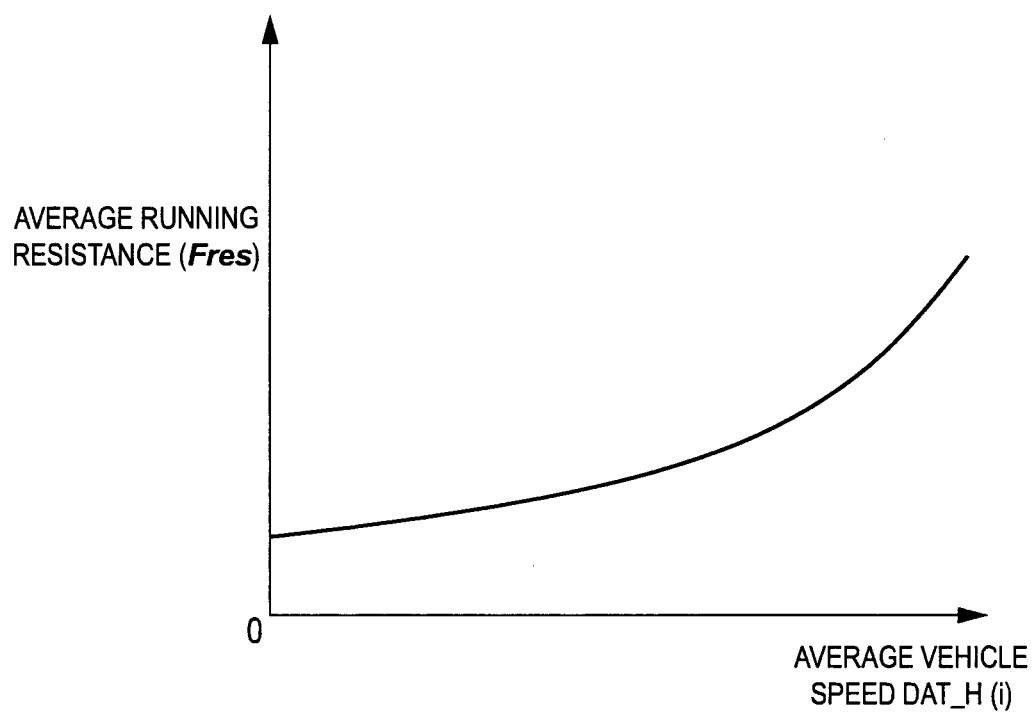
FIG. 12 is a diagram showing an example of a relationship between an average vehicle speed and an average running resistance, which is stored by the controller.

Further, the average running resistance Fres is determined by applying the average vehicle speed to each point DAT_H (i) to a map shown in FIG. 12.

In this embodiment, the controller 23 estimates the travel energy DAT_I (i) on the basis of travel route information from the host vehicle position to each point. In so doing, the travel energy is estimated with a high degree of precision.

The controller 23 may estimate the travel energy DAT_I (i) using information relating to only two points, namely the host vehicle position and each point. For example, the controller 23 may estimate the travel energy DAT_I (i) on the basis of an altitude difference and a linear distance between the host vehicle position and each point. In so doing, a calculation load is lightened.

Returning to FIG. 7, in a step S1604, the controller 23 extracts a point having a low travel likelihood from the points i (i=1, 2, 3, 4, 5 . . . ) stored in the array data of FIG. 11 on the basis of the road type DAT_D (i). The controller 23 then narrows down the points by removing points having a low travel likelihood from the array data. For example, a narrow road (type 0) has a smaller volume of traffic than a regional road (type 2). Hence, travel is less likely to occur on a narrow road. Accordingly, the controller 23 narrows down the points by removing points located on narrow roads.

In a step S1605, the controller 23 sets a "road search distance Rsrch from the host vehicle position" at an initial value. Then, on the basis of this initial value, the controller 23 defines an actual road information search area (battery energy management area) in order to manage the battery energy.

In a step S1606, the controller 23 narrows down the points. More specifically, the controller 23 narrows down the points by removing points at which the "linear distance from the host vehicle position DAT_F (i)" is greater than the "road search distance Rsrch from the host vehicle position", or in other words points beyond the road search distance Rsrch, from the points i (i=1, 2, 3, 4, 5 . . . ) stored in the array data of FIG. 11.

In a step S1607, the controller 23 determines a maximum value Edrvmax and a minimum value Edrvmin of the travel energy at the narrowed down points. More specifically, the controller 23 selects a maximum value and a minimum value of the "travel energy from the host vehicle position to each point DAT_I (i)" in the array data of FIG. 11. The step S1607 corresponds to a maximum/minimum extraction unit.

In a step S1608, the controller 23 calculates the SOC upper limit value and the SOC lower limit value. The SOC upper limit value and SOC lower limit value are a target upper limit value and a target lower limit value for managing the battery SOC so that the battery SOC does not become either excessive or deficient during travel in the battery energy management area. The step S1608 corresponds to a management target value calculation unit.

Specifically, the controller 23 determines a battery energy management upper limit value Ebin and a battery energy management lower limit value Ebout on the basis of a following equation.

$$Ebin = Emax - MAX(-Edrvmin, 0)$$

$$Ebout = MAX(Edrvmax, 0)$$

The controller 23 then calculates the SOC upper limit value by converting the battery energy management upper limit value Ebin into a battery SOC. Further, the controller 23 calculates the SOC lower limit value by converting the battery energy management lower limit value Ebout into a battery SOC.

Figure 13A:
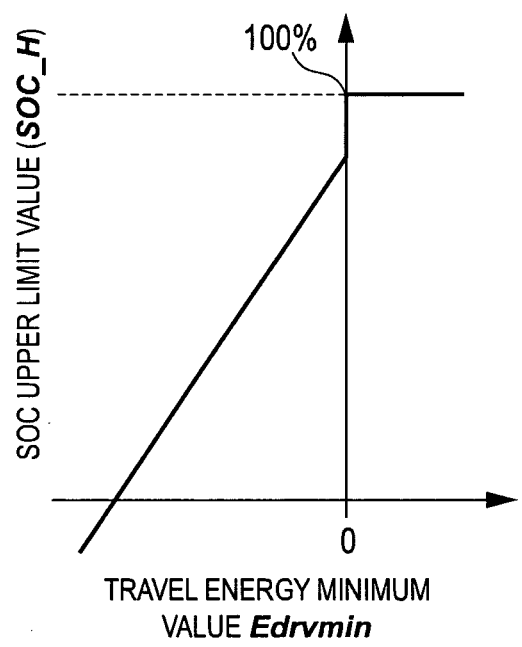
FIGS. 13A-13B are diagrams showing examples of a relationship between a travel energy minimum value and a SOC upper limit value and a relationship between a travel energy maximum value and a SOC lower limit value, which are stored by the controller.
Figure 13B:
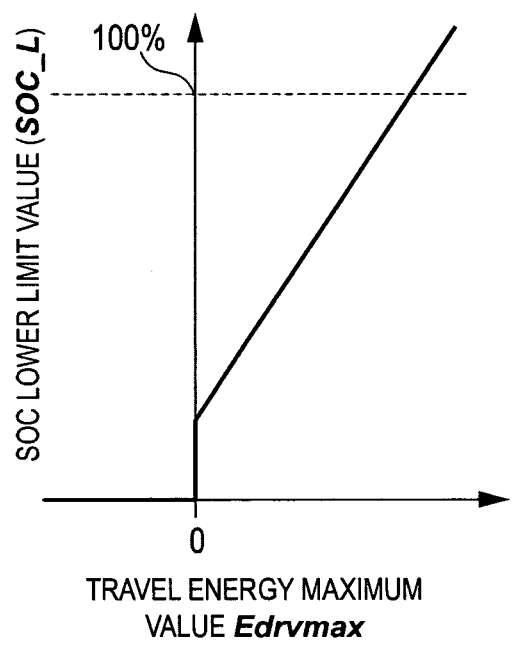

It should be noted that the controller 23 may determine the SOC upper limit value by applying the minimum travel energy value Edrvmin to a map shown in FIG. 13A. Further, the controller 23 may determine the SOC lower limit value by applying the maximum travel energy value Edrvmax to a map shown in FIG. 13B. As is evident from FIG. 13A, the SOC upper limit value (the battery energy management upper limit value Ebin) decreases as the minimum travel energy Edrvmin decreases (i.e. as the minimum travel energy Edrvmin swings toward a negative value). By setting the map in this manner, a steadily greater amount of regenerative energy can be collected as the minimum travel energy Edrvmin decreases. As is evident from FIG. 13B, the SOC lower limit value (the battery energy management lower limit value Ebout) increases as the maximum travel energy Edrvmax increases. By setting the map in this manner, a steadily greater amount of energy can be supplied during travel as the maximum travel energy Edrvmax increases.

The SOC upper limit value (battery energy management upper limit value Ebin) and the SOC lower limit value (battery energy management lower limit value Ebout) will now be described further with reference to FIG. 14.

In the step S1605, the initial value of the road search distance Rsrch is set. At this time, the battery energy management area is indicated by shading in FIG. 14. Travelable routes indicated by solid lines exist in the battery energy management area. Intended points 1 to 11 exist on the travelable routes. In FIG. 14, the energy required to travel from a host vehicle point 0 to a point 7 corresponds to the maximum travel energy Edrvmax, and the energy required to travel from the host vehicle point 0 to a point 11 corresponds to the minimum travel energy Edrvmin. The SOC upper limit value (battery energy management upper limit value Ebin) and the SOC lower limit value (battery energy management lower limit value Ebout) are determined on the basis of the maximum travel energy Edrvmax and the minimum travel energy Edrvmin, as shown in FIG. 15A.

The controller 25 then executes battery charging control through power generation, as shown in FIG. 3, to maintain the actual SOC within a battery energy management width ΔSOC between the SOC upper limit value and the SOC lower limit value. A remaining battery energy following travel to the maximum travel energy point 7 and the minimum travel energy point 11 serves reliably as a target value of the respective points. Hence, when the vehicle travels through the battery energy management area shown in FIG. 14, the battery energy does not become either excessive or deficient.

The maximum travel energy point 7 is located on a mountain pass. After exiting the pass, the vehicle travels continuously downhill, and therefore a large amount of energy can be charged. Hence, the remaining battery energy is preferably as low as possible at the maximum travel energy point 7. When the remaining battery energy is low, a large amount of energy can be charged on the downhill slope. Accordingly, the target value of the remaining battery energy at the maximum travel energy point 7 is preferably made as low as possible.

The minimum travel energy point 11 is located at the bottom of a valley. After exiting the valley bottom, the vehicle travels continuously uphill, and therefore a large amount of battery energy is required. Hence, the remaining battery energy is preferably as high as possible at the minimum travel energy point 11. When the remaining battery energy is high, a large amount of battery energy can be supplied on the uphill slope. Accordingly, the target value of the remaining battery energy at the minimum travel energy point 11 is preferably made as high as possible.

Hence, the remaining battery energy is reduced as far as possible before a downhill slope, and therefore an energy collection efficiency is improved as the vehicle travels downhill, leading to an improvement in fuel efficiency.

Further, the remaining battery energy is increased as far as possible before an uphill slope, and therefore a deficiency does not occur in the battery energy even when the vehicle travels uphill.

However, when the maximum travel energy Edrvmax is extremely large, the battery energy management lower limit value (Ebout=MAX (Edrvmax, 0)) also becomes extremely large. As a result, the correct magnitude relationship shown in FIG. 15A may reverse such that the battery energy management lower limit value Ebout exceeds the battery energy management upper limit value Ebin, leading to a state shown in FIG. 15B.

Further, when the regenerative energy is extremely large and the minimum travel energy Edrvmin is extremely small, the battery energy management upper limit value (Ebin=Emax−MAX (−Edrvmin, 0)) becomes extremely small. In other words, the correct magnitude relationship shown in FIG. 15A may reverse such that the battery energy management lower limit value Ebout exceeds the battery energy management upper limit value Ebin, leading to the state shown in FIG. 15B.

This reversal in the magnitude relationship between the battery energy management upper limit value Ebin and the battery energy management lower limit value Ebout is caused by a correlation among three parties, namely the maximum travel energy Edrvmax, the minimum travel energy Edrvmin, and a total battery capacity Emax.

In a state where the magnitude relationship between the battery energy management upper limit value Ebin (SOC upper limit value) and the battery energy management lower limit value Ebout (SOC lower limit value) reverses, the battery charging control through power generation of FIG. 3 is not executed. Further, battery charging control for ensuring that the battery energy becomes neither excessive nor deficient is not executed in the battery energy management area shown in FIG. 14. Further, charging control for ensuring that the remaining battery energy is as low as possible before a downhill slope is not executed. Further, charging control for ensuring that the remaining battery energy is as high as possible before an uphill slope is not executed.

When charging control for ensuring that the remaining battery energy is as low as possible before a downhill slope is not executed, the battery is charged by energy collected on the downhill slope so as to become fully charged at a midway point on the downhill slope. As a result, regenerative power is wasted, causing the fuel efficiency to deteriorate.

Further, when charging control for ensuring that the remaining battery energy is as high as possible before an uphill slope is not executed, the battery energy may become deficient at a midway point on the uphill slope.

An object of this embodiment is to prevent the problems described above from occurring by ensuring that the magnitude relationship between the battery energy management upper limit value Ebin (SOC upper limit value) and the battery energy management lower limit value Ebout (SOC lower limit value) does not reverse.

Hence, in a step S1609, the controller 23 determines the battery energy management width ΔSOC by subtracting a SOC lower limit value SOC_L from a SOC upper limit value SOC_H. In other words, the battery energy management width ΔSOC is expressed by a following equation. The step S1609 corresponds to a battery energy management width calculation unit.

$$\Delta SOC = SOC\_H - SOC\_L$$

Figure 15A:
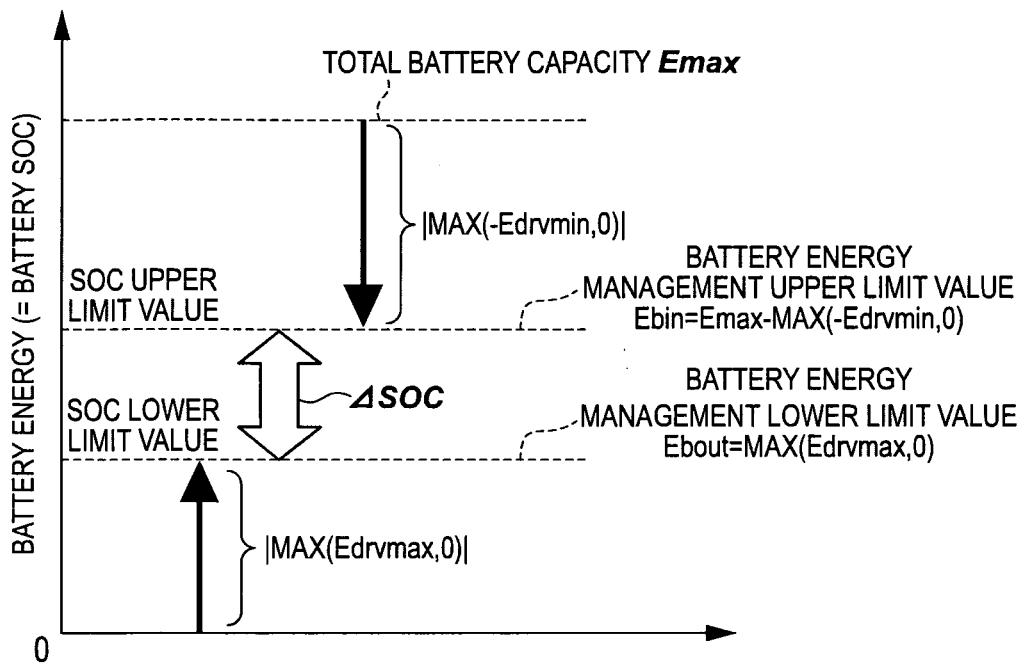
FIGS. 15A-15B are diagrams showing examples of a relationship between the SOC upper limit value and the SOC lower limit value of a battery.
Figure 15B:
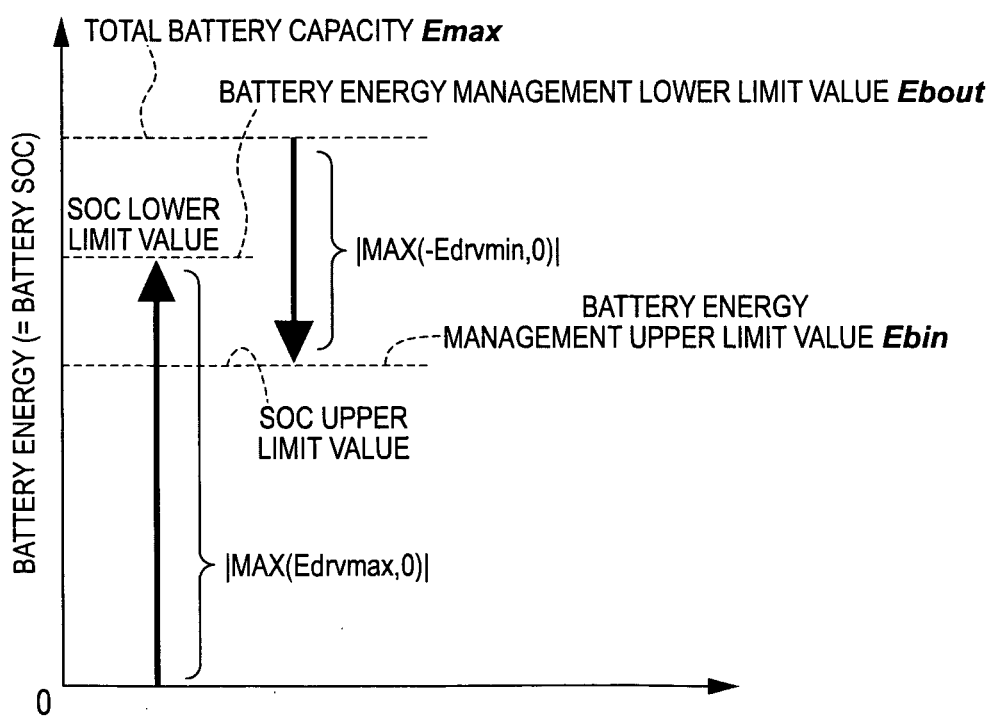

The controller 23 then determines whether or not the battery energy management width ΔSOC is larger than a positive predetermined value shown in FIG. 15A. Here, as shown in FIG. 15A, the positive predetermined value is a reference value for determining that the SOC upper limit value is larger than the SOC lower limit value. In other words, as shown in FIG. 15B, the positive predetermined value is a reference value for determining that the SOC upper limit value has not fallen below the SOC lower limit value.

When the battery energy management width ΔSOC is smaller than the positive predetermined value, this indicates that the SOC upper limit value is smaller than the SOC lower limit value and therefore a problem may occur during the control.

Hence, after determining in the step S1609 that the battery energy management width ΔSOC is smaller than the positive predetermined value, the controller 23 advances the processing to a step S1610 and then returns to the step S1606.

In the step S1610, the controller 23 sets a new road search distance Rsrch. In FIG. 7, the controller 23 sets the new road search distance Rsrch by subtracting a predetermined distance ΔRsrch from the currently set road search distance Rsrch.

It should be noted that precise battery charging control cannot be executed also when the battery energy management width ΔSOC is too large, and only rough battery charging control can be executed. Therefore, when the battery energy management width ΔSOC is too large, the battery energy management width ΔSOC may be narrowed by advancing the processing from the step S1609 to the step S1610, setting a new road search distance Rsrch, and recalculating the SOC upper limit value and SOC lower limit value. The step S1610 corresponds to a management area modification unit.

Figure 16:
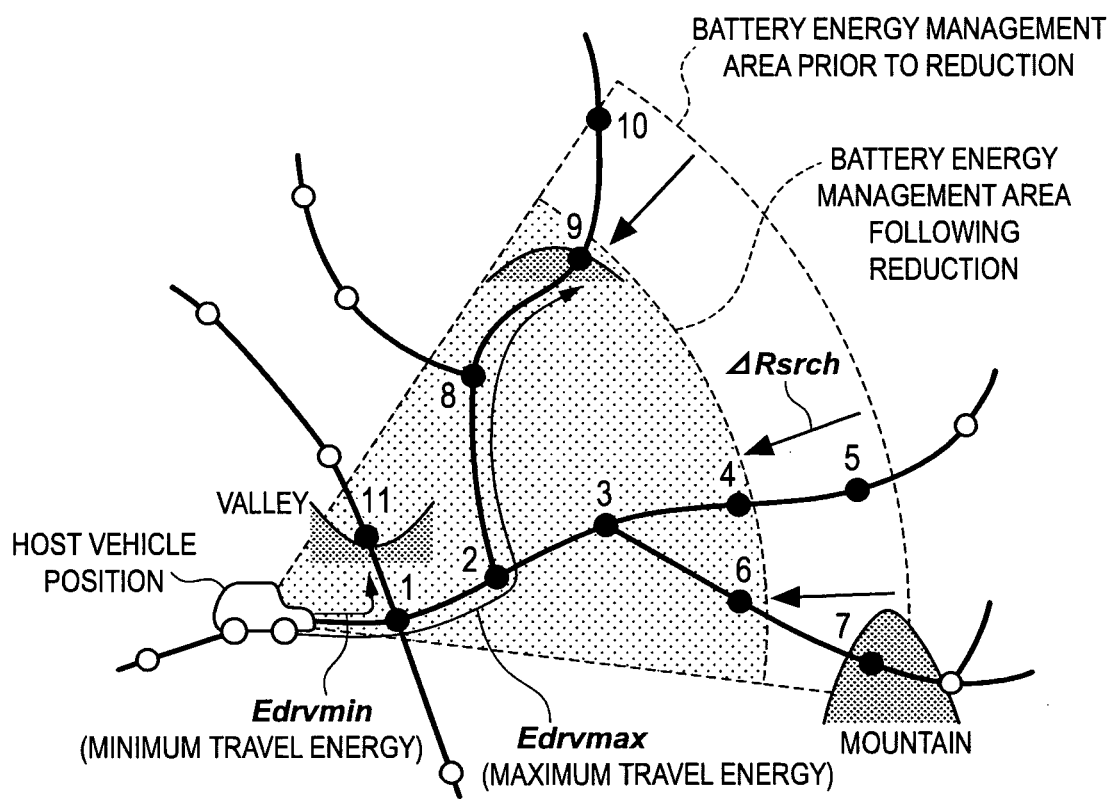
FIG. 16 is a diagram illustrating an operation according to this embodiment in a case where a battery energy management area is reduced.

The control is then returned from the step S1610 to the step S1606. In the step S1606, the battery energy management area is reset on the basis of the new road search distance Rsrch. As a result, the battery energy management area is narrowed, as shown in FIG. 16. In the step S1607, the maximum travel energy Edrvmax and minimum travel energy Edrvmin are determined anew. In FIG. 14, the energy required to travel from the host vehicle point 0 to the point 7 corresponds to the maximum travel energy Edrvmax, whereas in FIG. 16, the energy required to travel from the host vehicle point 0 to a point 9 corresponds to the maximum travel energy Edrvmax. Hence, the maximum travel energy Edrvmax decreases. Accordingly, the SOC lower limit value calculated in the step S1608 decreases below the SOC upper limit value.

The controller 23 then advances the control from the step S1609 to a step S1611.

In the step S1611, the controller 23 determines whether or not an external charging base (the household 7 or the charging stand 8) is included in the battery energy management area. Accordingly, the step S1611 corresponds to a charging base determination unit.

When an external charging base is not included in the battery energy management area, the controller 23 returns the control to the step S17 of FIG. 6. When an external charging base is included in the battery energy management area, the controller 23 advances the control to a step S1612.

In the step S1612, the controller 23 sets the "linear distance from the host vehicle position to the external charging base DAT_F (i)" as the "road search distance. Rsrch from the host vehicle position". The controller 23 then resets the battery energy management area to reduce the battery energy management area. The step S1612 corresponds to a battery energy management area reduction unit.

In a step S1613, the controller 23 removes points, from among the points i (i=1, 2, 3 . . . ) stored in the array data of FIG. 11, at which the "linear distance from the host vehicle position DAT_F (i)" is longer than the road search distance Rsrch set in the step S1612, or in other words points that are farther than the linear distance to the external charging base, from the array data in order to narrow down the points.

In a step S1614, the controller 23 searches the "travel energy from the host vehicle position to each point DAT_I (i)" in the array data of FIG. 11 and extracts the maximum value Edrvmax and minimum value Edrvmin of the travel energy.

In a step S1615, the controller 23 calculates the SOC upper limit value and the SOC lower limit value on the basis of the maximum travel energy Edrvmax and the minimum travel energy Edrvmin.

More specifically, the controller 23 determines the battery energy management upper limit value Ebin and the battery energy management lower limit value Ebout on the basis of a following equation.

$$Ebin = Emax - MAX(-Edrvmin, 0)$$

$$Ebout = MAX(Edrvmax, 0)$$

The controller 23 then calculates the SOC upper limit value by converting the battery energy management upper limit value Ebin into a battery SOC. Further, the controller 23 calculates the SOC lower limit value by converting the battery energy management lower limit value Ebout into a battery SOC.

Figure 17:
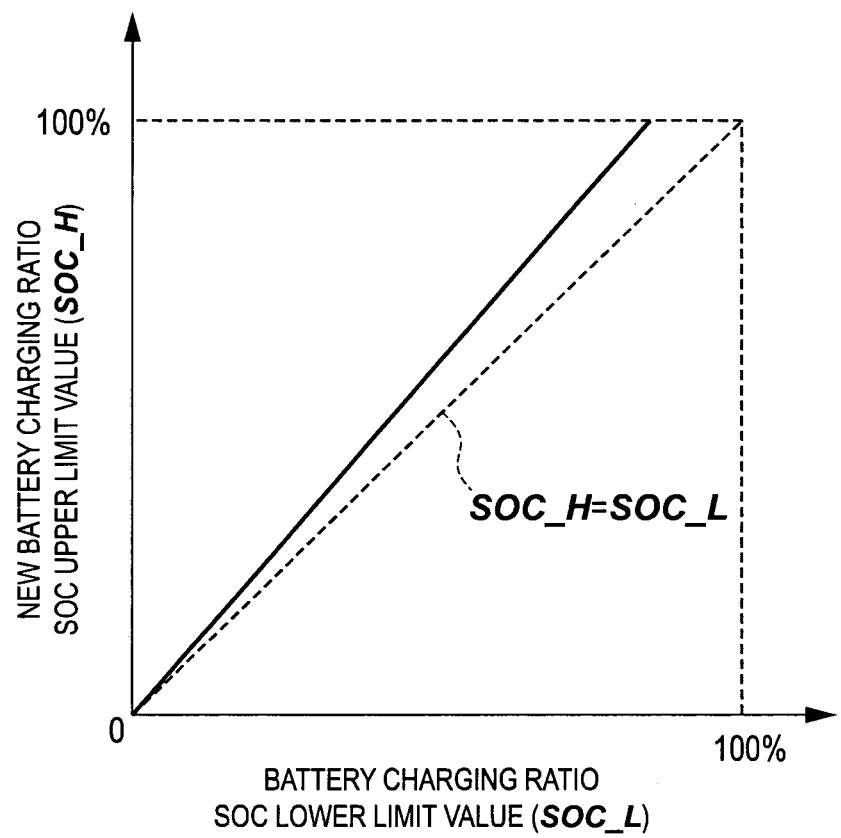
FIG. 17 is a diagram showing an example of the relationship between the SOC upper limit value and the SOC lower limit value in a case where an external charging base exists in the battery energy management area, which is stored by the controller.

In a step S1616, the controller 23 calculates a new SOC upper limit value SOC_H from the SOC lower limit value SOC_L on the basis of a map shown in FIG. 17. As is evident from FIG. 17, the new SOC upper limit value SOC_H is greater than the SOC lower limit value SOC_L by a predetermined ratio. The step S1616 corresponds to a management upper limit value modification unit. After calculating the new SOC upper limit value SOC_H, the controller 23 returns the control to the step S17 of FIG. 6.

[Actions and Effects]

As described above, in the engine power generation control of FIG. 3, control is performed such that the battery SOC (remaining battery energy) is smaller than the SOC upper limit value (battery energy management upper limit value) and larger than the SOC lower limit value (battery energy management lower limit value).

The SOC upper limit value (battery energy management upper limit value) and SOC lower limit value (battery energy management lower limit value) are set by the control of FIG. 7, and therefore the following actions and effects are achieved.

In the steps S1606, S1607 and S1608 of FIG. 7, the controller 23 extracts the maximum value Edrvmax and minimum value Edrvmin of the travel energy required to reach intended points (the points 1 to 11 in FIG. 14) on at least one travelable route within an area (the battery energy management area in which the likelihood of travel is high) extending ahead of the host vehicle position up to the road search distance Rsrch. The controller 23 then calculates the SOC upper limit value and SOC lower limit value for ensuring that the battery energy becomes neither excessive nor deficient during travel in the battery energy management area.

Then, after determining that the magnitude relationship between the SOC upper limit value and SOC lower limit value will not reverse from the correct magnitude relationship shown in FIG. 15A on the basis of the battery energy management width ΔSOC (step S1609) and determining that an external charging base (the household 7 or the charging stand 8) does not exist at the intended point (step S1611), the controller 23 transmits the SOC upper limit value and the SOC lower limit value as is (step S17).

In this embodiment, the SOC upper limit value and SOC lower limit value are modified during travel within the battery energy management area. The specific content of this processing will now be described with reference to FIG. 18, using a case in which an altitude variation occurs. At times t0, t2, t4 when the altitude begins to increase, the SOC upper limit value and SOC lower limit value are raised in order to increase the battery SOC in preparation for an uphill slope. At times t1, t3 when the altitude begins to decrease, the SOC upper limit value and SOC lower limit value are lowered in order to reduce the battery SOC in preparation for a downhill slope.

Figure 19:
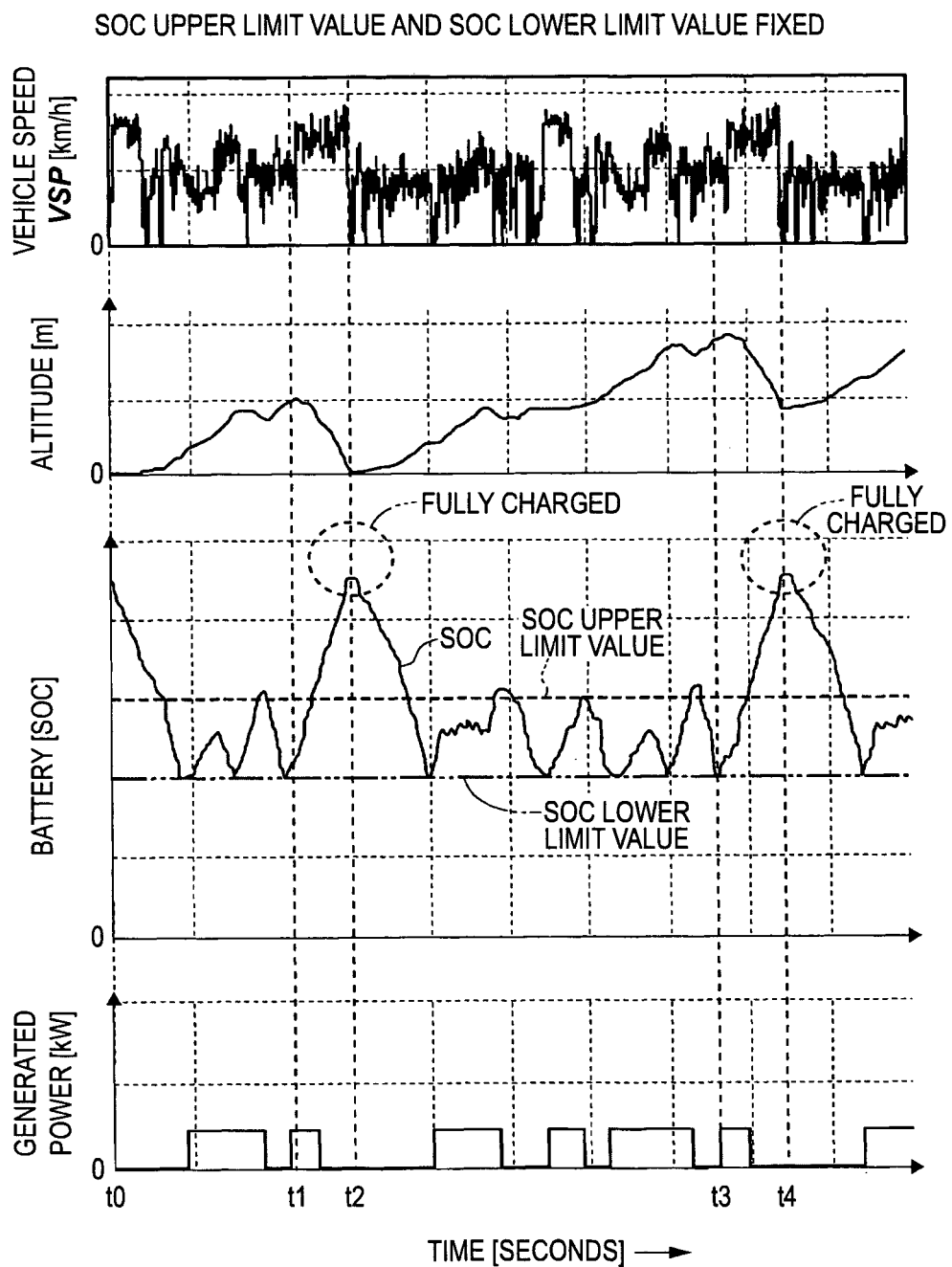
FIG. 19 is a time chart of an operation according to a comparative embodiment.

In FIG. 19, which shows a comparative embodiment, the SOC upper limit value and SOC lower limit value take fixed values. In this case, the battery SOC decreases from the times t0, t2, t4, at which the altitude begins to increase, onward. Further, the battery SOC increases from the times t1, t3, at which the altitude begins to decrease, onward. At the times t2, t4, a fully charged state is reached, and therefore energy collection through regenerative braking cannot be performed. As a result, the energy collection efficiency deteriorates.

According to this embodiment, on the other hand, the SOC upper limit value and SOC lower limit value are raised at the times t0, t2, t4 when the altitude begins to increase, as described above, and therefore the battery SOC, which is controlled to a value between the SOC upper limit value and the SOC lower limit value, also increases, leading to an improvement in an uphill travel performance.

Further, the SOC upper limit value and SOC lower limit value are reduced at the times t1, t3 when the altitude begins to decrease, and therefore the battery SOC, which is controlled to a value between the SOC upper limit value and the SOC lower limit value, also decreases, leading to an improvement in energy collection efficiency during regenerative braking while traveling downhill.

However, to obtain the actions and effects described above, the magnitude relationship between the SOC upper limit value and SOC lower limit value must correspond to the correct magnitude relationship shown in FIG. 15A. In other words, the SOC upper limit value must be larger than the SOC lower limit value. When the magnitude relationship reverses relative to the correct relationship, the above actions and effects are not obtained.

Hence, in this embodiment, when the magnitude relationship between the SOC upper limit value and the SOC lower limit value reverses relative to the correct relationship, the battery energy management area is reduced by ΔRsrch, whereupon the SOC upper limit value and SOC lower limit value are determined anew.

By determining the SOC upper limit value and SOC lower limit value anew in this manner, the magnitude relationship between the SOC upper limit value and the SOC lower limit value corresponds reliably to the correct magnitude relationship shown in FIG. 15A.

The engine power generation control of FIG. 3 is then executed using the SOC upper limit value and SOC lower limit value having the correct magnitude relationship.

Figure 14:
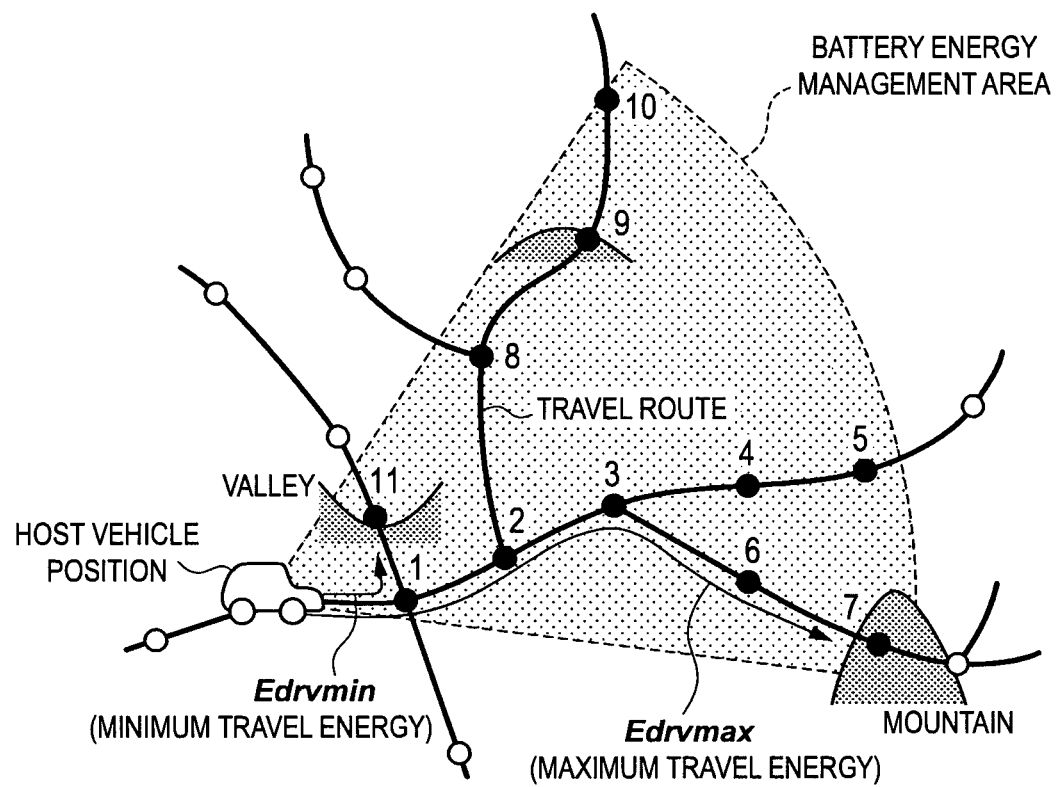
FIG. 14 is a diagram illustrating an operation according to this embodiment.

FIGS. 14-16 will now be described further.

When the magnitude relationship between the SOC upper limit value and SOC lower limit value determined in the step S1608 reverses relative to the correct magnitude relationship shown in FIG. 15A such that the state shown in FIG. 15B is established, this state is determined in the step S1609, whereupon the battery energy management area is reduced by ΔRsrch in the step S1610, as shown in FIG. 16.

As shown in FIG. 14, before the area is reduced, the energy required to travel from the host vehicle point 0 to the point 7 corresponds to the maximum travel energy Edrvmax.

As shown in FIG. 16, once the area has been reduced, the energy required to travel from the host vehicle point 0 to the point 9 corresponds to the maximum travel energy Edrvmax.

Hence, the maximum travel energy Edrvmax is reduced, and on the basis of the battery energy management area (the reduced maximum travel energy Edrvmax) following the reduction of FIG. 16, the SOC lower limit value is determined anew to be smaller. As a result, the magnitude relationship between the SOC upper limit value and the SOC lower limit value corresponds to the correct magnitude relationship.

Figure 18:
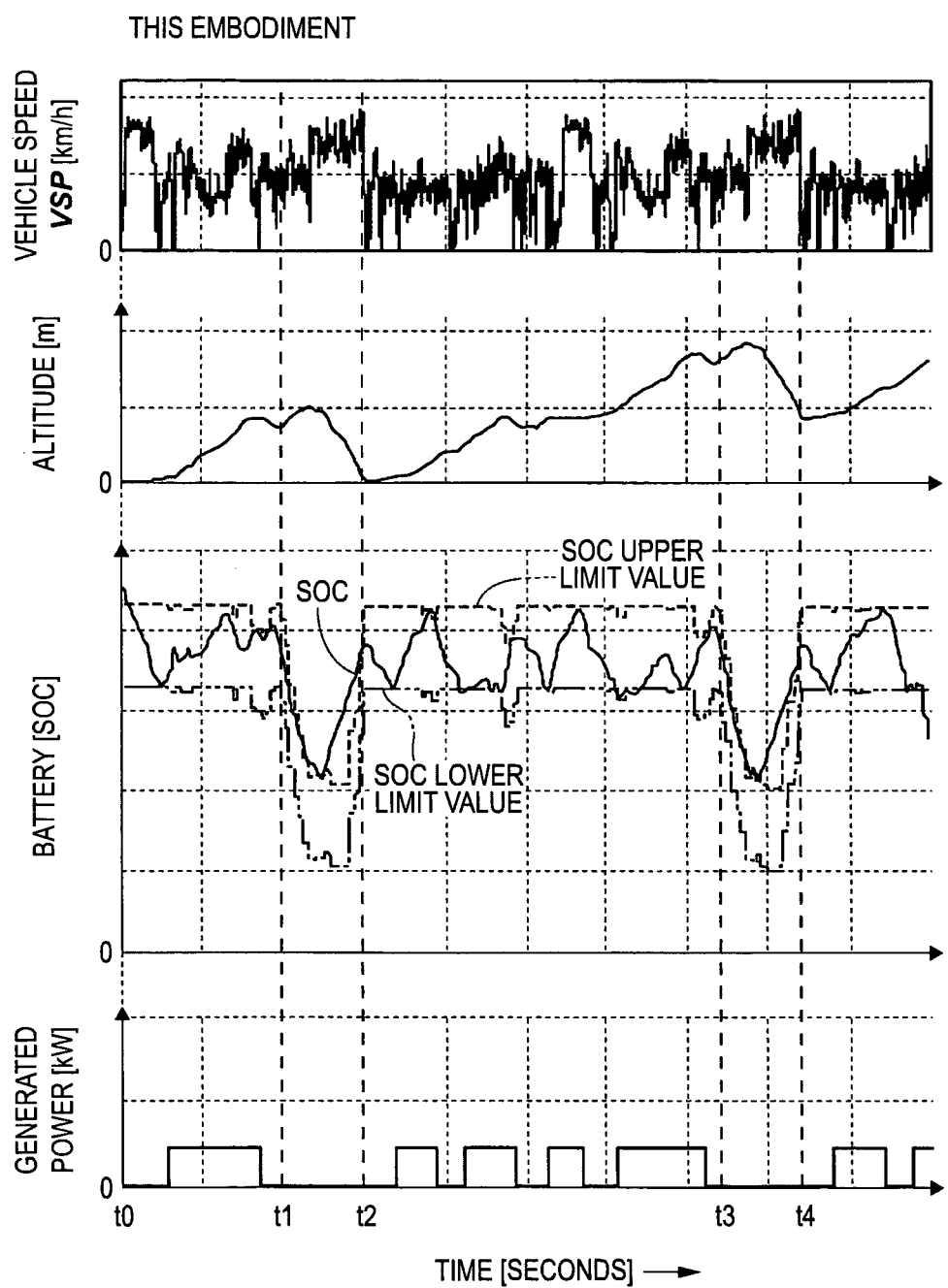
FIG. 18 is a time chart of the operation according to this embodiment.

By making the magnitude relationship between the SOC upper limit value and the SOC lower limit value correspond to the correct magnitude relationship shown in FIG. 15A reliably in this manner, the actions and effects illustrated with reference to FIG. 18 are secured.

More specifically, charging control for reducing the battery SOC (the remaining battery energy) as much as possible before a downhill slope is secured. When the battery reaches a fully charged state due to regenerative braking (regenerative power) during downhill travel, charging (regenerative power collection) is not performed thereafter. As a result, the regenerative power is wasted, causing the fuel efficiency to deteriorate. In this embodiment, this type of situation is avoided.

Further, charging control for increasing the battery SOC (the remaining battery energy) as much as possible before an uphill slope is secured. As a result, a situation in which the battery energy becomes deficient on an uphill slope, causing the travel performance to deteriorate, is avoided.

It should be noted that in this embodiment, a case in which the maximum travel energy is reduced by reducing the battery energy management area in order to switch the point at which the travel energy reaches a maximum was described. However, the minimum travel energy may be increased by switching the point at which the travel energy reaches a minimum. In so doing, the SOC upper limit value increases, and as a result, the magnitude relationship between the SOC upper limit value and the SOC lower limit value is set at the correct magnitude relationship.

Further, when a difference between the SOC upper limit value and the SOC lower limit value is too large, even though the magnitude relationship between the SOC upper limit value and the SOC lower limit value does not reverse, the battery energy management area widens, and as a result, the difference between the SOC upper limit value and the SOC lower limit value enters a predetermined range.

Figure 20A:
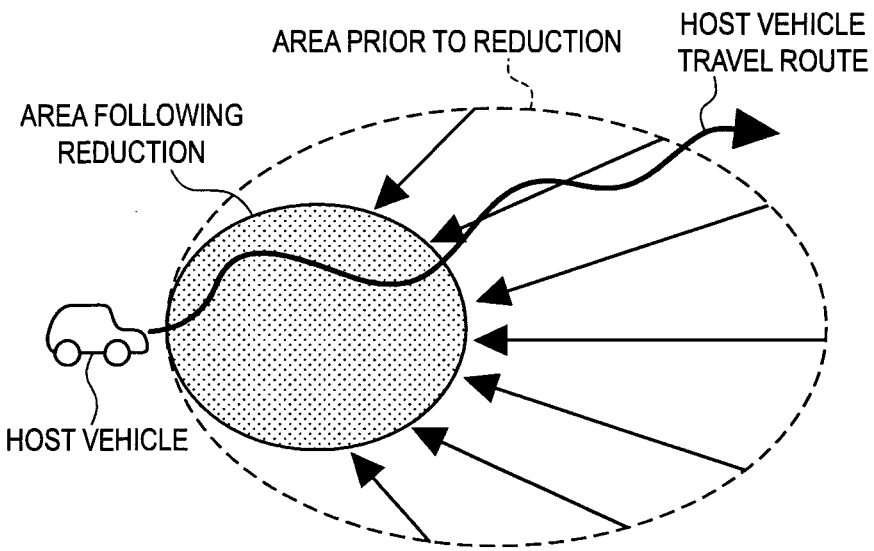
FIGS. 20A-20B are diagrams illustrating the case in which the battery energy management area is reduced.
Figure 21A:
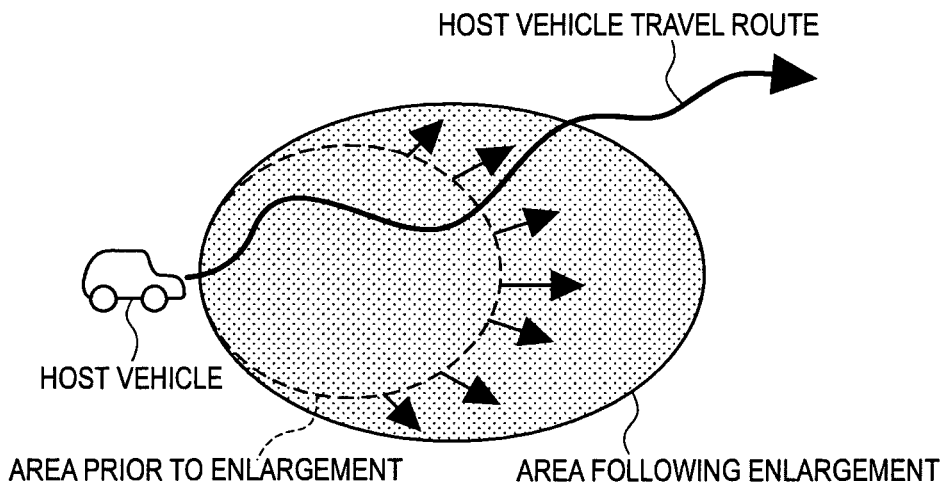
FIGS. 21A-21B are diagrams illustrating a case in which the battery energy management area is enlarged.

According to this embodiment, when the battery energy management area narrows, an area close to the host vehicle remains while an area removed from the host vehicle is excluded, as shown in FIG. 20A. When the battery energy management area widens, an area far from the host vehicle is included in the battery energy management area together with the area close to the host vehicle, as shown in FIG. 21A.

Figure 20B:
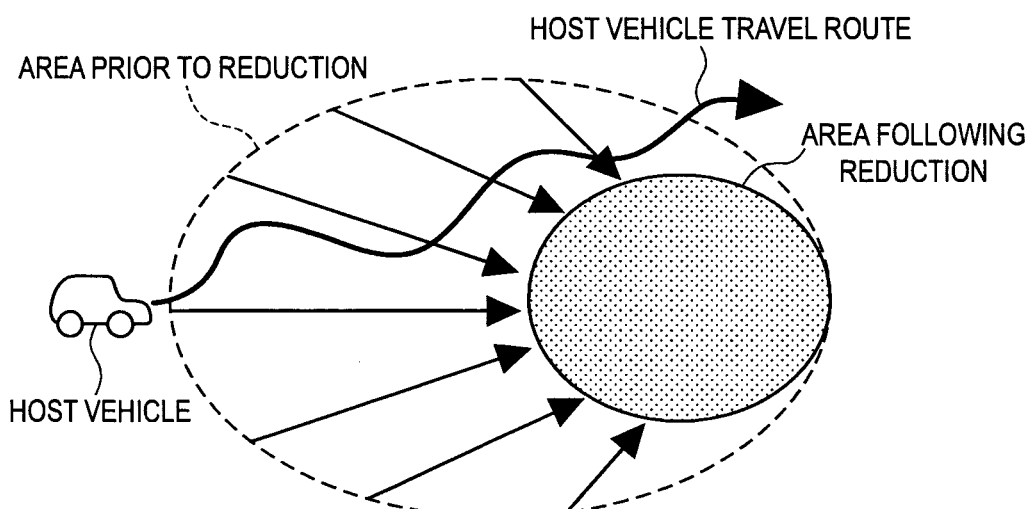
Figure 21B:
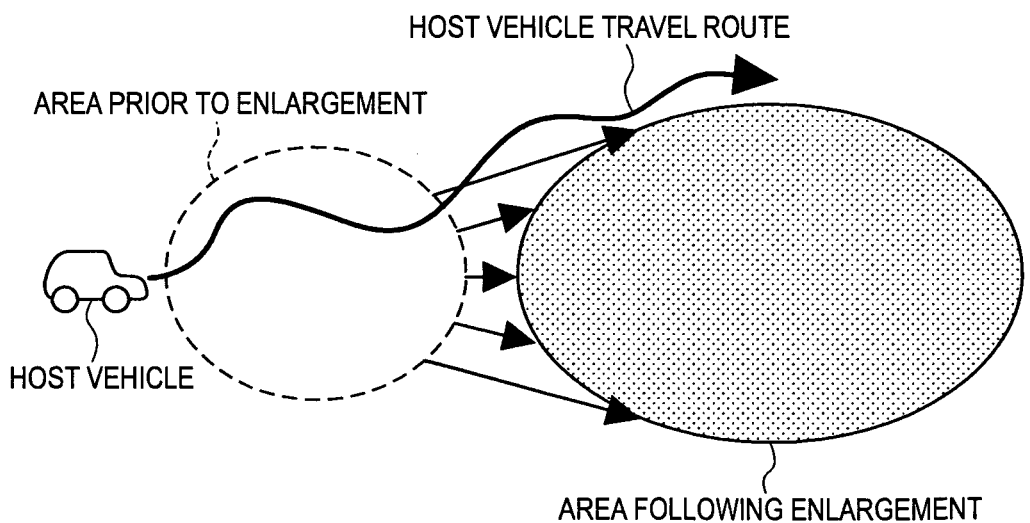

When the battery energy management area is modified to include a location removed from the host vehicle, the modified battery energy management area may not include the travel route of the host vehicle, as shown in FIGS. 20B and 21B. In this case, the control described above is not executed.

In this embodiment, as described above, the battery energy management area is reduced or enlarged such that the area close to the host vehicle is included. Hence, the host vehicle travels in the modified area, and as a result, the actions and effects described above are obtained even more reliably.

Typically, the fuel efficiency of an HEV varies according to traveling conditions on the route such as vehicle speed variation, a deceleration energy regeneration condition, and the travel distance.

In this embodiment, the "travel energy from the host vehicle position to each point DAT_I (i)" is calculated in the step S1603 of FIG. 7 using the vehicle mass M, the gravitational acceleration G, the altitude of each point DAT_C (i), the altitude of the host vehicle position HGTcur, the average running resistance Fres, and the travel distance DAT_G(i).

By estimating the travel energy DAT_I (i) on the basis of travel route information from the host vehicle position to each point in this manner, the travel energy DAT_I (i) can be estimated with a high degree of precision, and as a result, the actions and effects described above are obtained even more reliably.

When an external charging base (the household 7 or the charging stand 8) exists at an intended point in the battery energy management area (step S1611), the battery energy management area is reset (step S1612) and an area that is farther than the linear distance to the external charging base is excluded (step S1613).

In the step S1614, the maximum value Edrvmax and minimum value Edrvmin of the travel energy to a point in the newly set area are extracted. In the step S1615, the SOC upper limit value is calculated on the basis of the minimum travel energy Edrvmin and the SOC lower limit value is calculated on the basis of the maximum travel energy Edrvmax. In the step S1616, a new SOC upper limit value that is larger than the SOC lower limit value by a fixed ratio (see FIG. 17) is calculated.

The new SOC upper limit value is used together with the SOC lower limit value calculated in the step S1615 during the engine power generation control of FIG. 3.

As a result, the following actions and effects are obtained.

Figure 22:
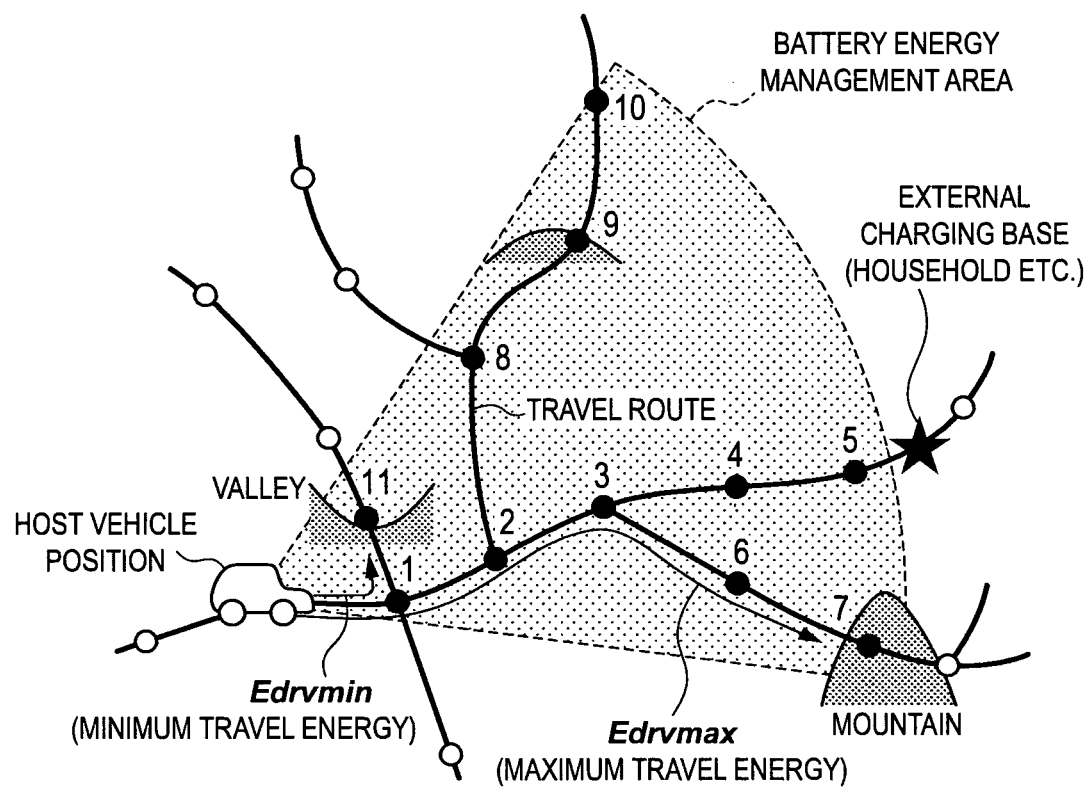
FIG. 22 is a diagram showing a state in which an external charging base exists outside of the battery energy management area ahead of a host vehicle position in a travel direction.

FIG. 22 is a view showing a situation in which the host vehicle travels over the point 0.

Figure 24:
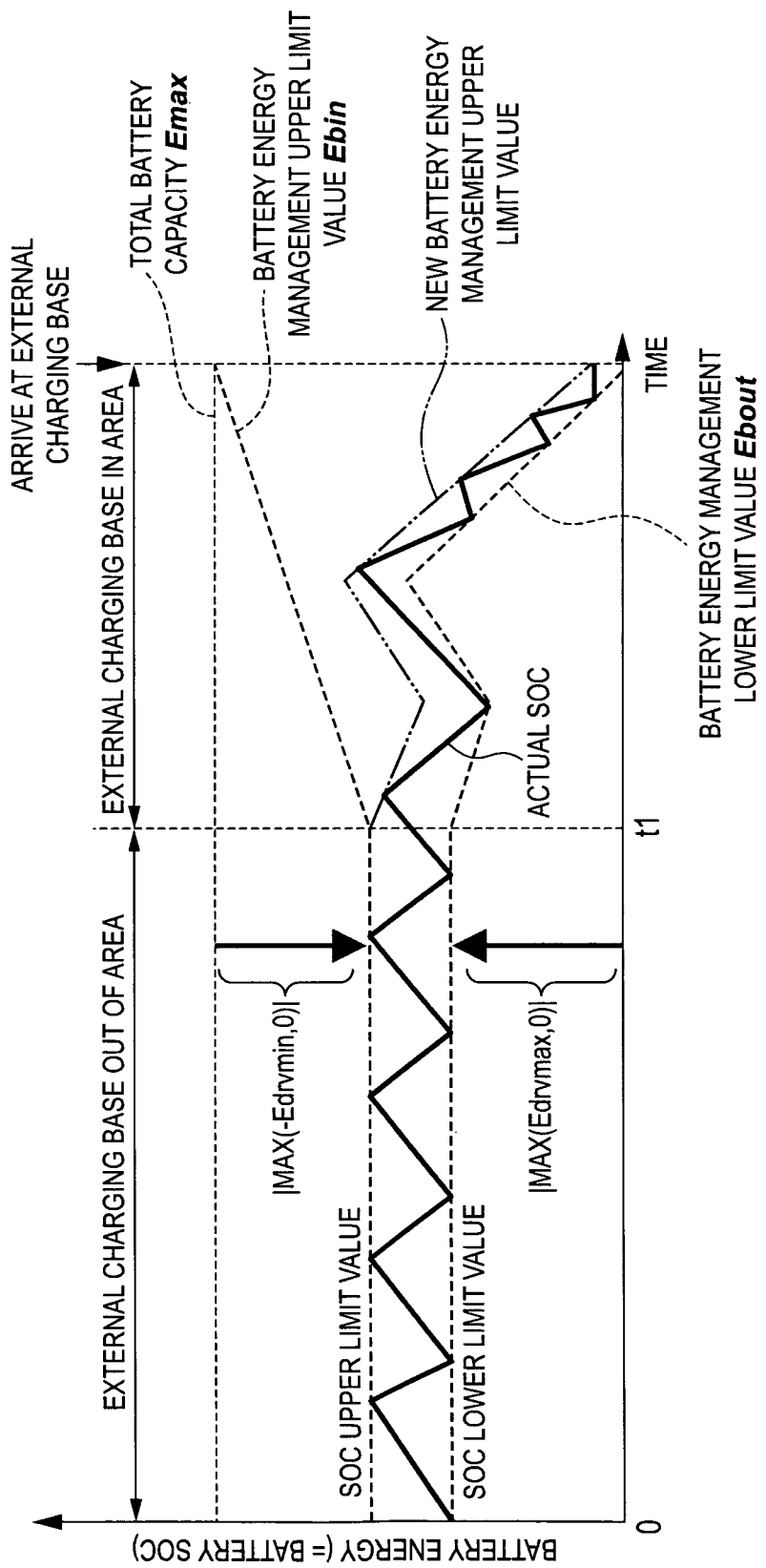
FIG. 24 is a time chart showing variation in the battery energy when the external charging base enters the batter energy management area.
Figure 25:
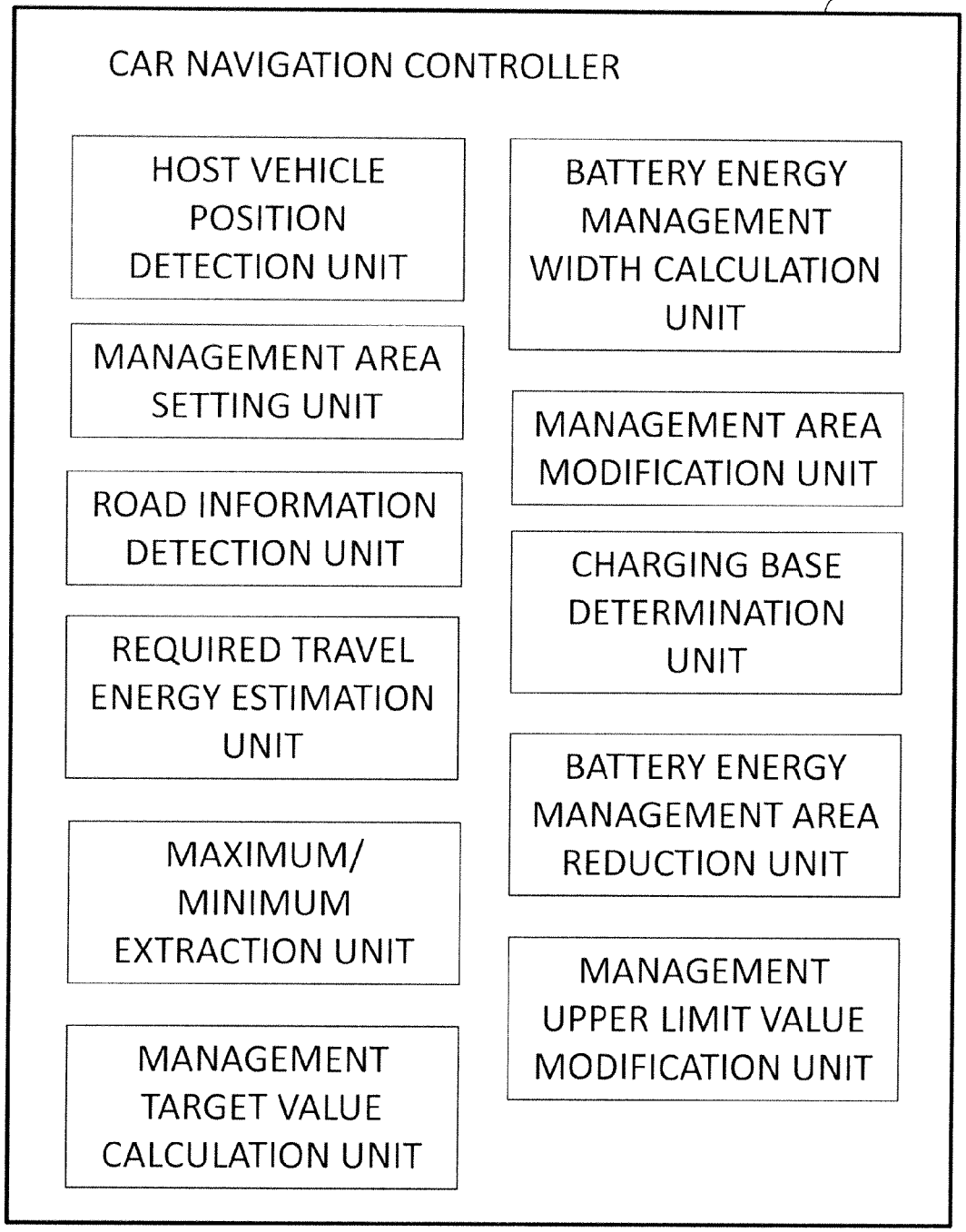
FIG. 25 is a schematic diagram showing a car navigation controller according to one embodiment.
Figure 26:
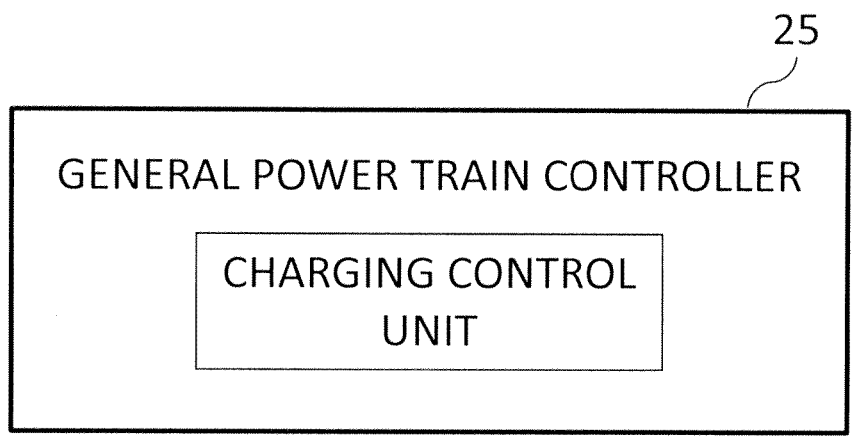
FIG. 26 is a schematic diagram showing a general power train controller according to one embodiment.

In the host vehicle position of FIG. 22, an external charging base does not yet exist in the battery energy management area. The SOC upper limit value and SOC lower limit value are determined in the step S1608 of FIG. 7. The SOC upper limit value and SOC lower limit value are shown up to a time t1 in FIG. 24. Engine power generation control is then executed such that the battery SOC is smaller than the SOC upper limit value and larger than the SOC lower limit value.

Figure 23:
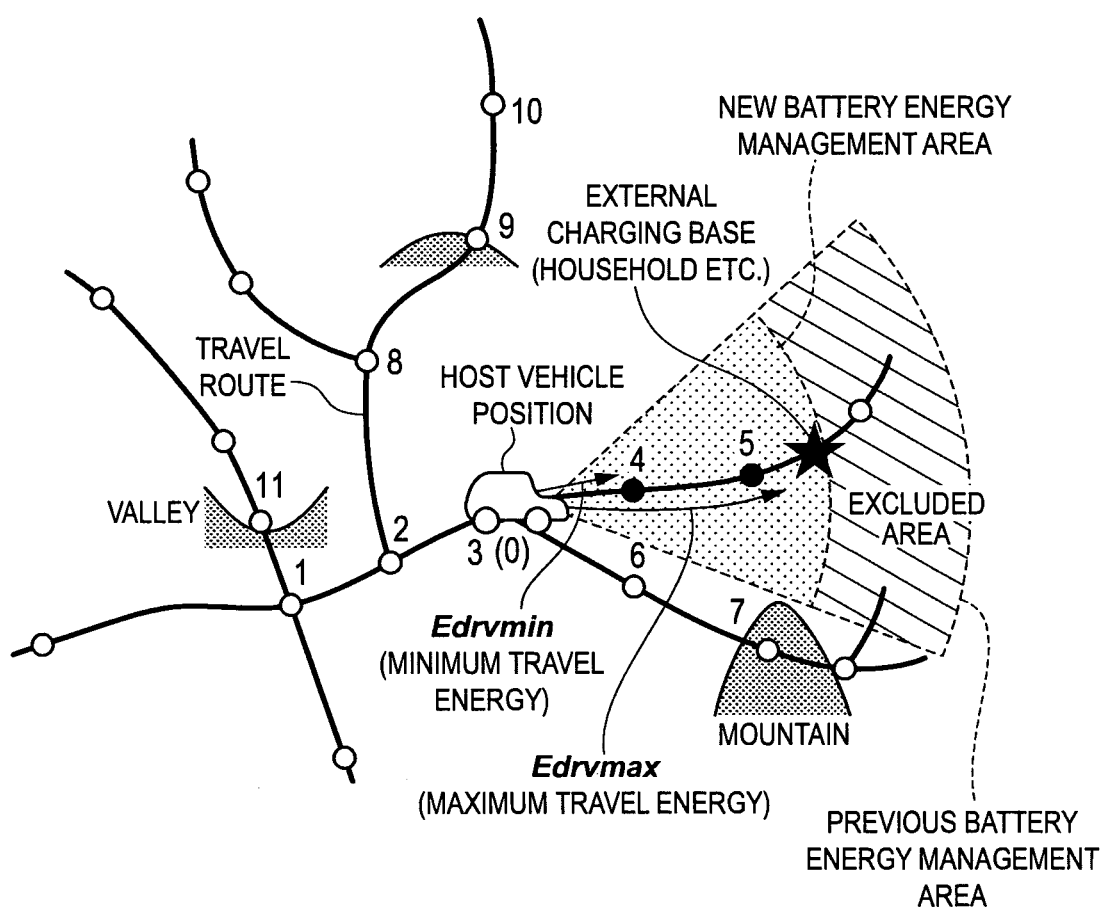
FIG. 23 is a diagram showing a state in which a host vehicle travels from the state shown in FIG. 22 such that the external charging base enters the batter energy management area.

When the host vehicle has reached a position shown in FIG. 23, an external charging base exists in the battery energy management area. In this embodiment, the battery energy management area is reset such that an area (indicated by diagonal lines in FIG. 23) farther from the host vehicle position than the linear distance to the external charging base is excluded. The SOC lower limit value is then set on the basis of the maximum travel energy Edrvmax to a point within the reset area. A SOC upper limit value that is larger than the SOC lower limit value by a fixed ratio (see FIG. 17) is then set. The SOC upper limit value and SOC lower limit value set in this manner are then used during the engine power generation control of FIG. 3.

If the SOC upper limit value is not set in this manner, the maximum energy Edrvmax and minimum energy Edrvmin decrease gradually toward 0 as the host vehicle approaches the external charging base and the battery energy management area narrows. The SOC upper limit value then increases gradually from t1 in FIG. 24 onward, as shown by a dotted line. In this case, the difference between the SOC upper limit value and the SOC lower limit value increases, or in other words the battery energy management width ΔSOC increases. As a result, optimum engine power generation control cannot be executed.

However, in this embodiment, the SOC upper limit value is set to be larger than the SOC lower limit value by a fixed ratio, and therefore the battery energy management width ΔSOC remains appropriate even when an external charging base exists within the battery energy management area. Hence, optimum engine power generation control is executed.

Although the invention has been described above by reference to certain embodiments of the invention, the invention is not limited to the embodiments described above. Modifications and variations of the embodiments described above will occur to those skilled in the art, within the scope of the claims.

For example, when an uphill slope exists immediately before an external charging base, the SOC upper limit value and SOC lower limit value may be increased temporarily in preparation for the uphill slope.

By increasing the SOC upper limit value and SOC lower limit value temporarily in front of an uphill slope located immediately before an external charging base, the battery SOC increases temporarily before the uphill slope. Therefore, the remaining battery energy can be reduced reliably before the host vehicle arrives at the external charging base, and as a result, a large amount of power can be charged at the external charging base, which is cost-efficient and good for the environment.

The contents of Japanese Patent Application No. 2009-127110 with a filing date of May 27, 2009 in Japan are hereby incorporated by reference.

The embodiments of this invention in which an exclusive property or privilege is claimed are defined as follows:

The invention claimed is:

1. A battery charging control device for an electric vehicle, the battery charging control device being configured to control charging a battery by controlling a power generation device installed in the electric vehicle, comprising:

at least one controller comprising:

a current position detection unit configured to detect a current position of a host vehicle;

a management area setting unit configured to set a battery energy management area using the current position as a reference;

a road information detection unit configured to detect at least one travelable route within the battery energy management area;

a required travel energy estimation unit configured to estimate energy values required to travel to respective points on the travelable route from the current position on the basis of information relating to the current position and information relating to the respective points;

a maximum/minimum extraction unit configured to extract a maximum value and a minimum value from the required travel energy values;

a management target calculation unit configured to calculate a battery energy management upper limit value and a battery energy management lower limit value on the basis of the maximum value and the minimum value of the required travel energy;

a battery energy management width calculation unit configured to calculate a battery energy management width by subtracting the battery energy management lower limit value from the battery energy management upper limit value;

a management area modification unit configured to modify the battery energy management area when the battery energy management width is not within a predetermined range such that the battery energy management width enters the predetermined range; and a charging control unit configured to control the vehicle-installed power generation device such that a remaining battery energy is within the battery energy management width between the battery energy management upper limit value and the battery energy management lover limit value.

2. The battery charging control device for an electric vehicle as defined in claim 1, wherein the required travel energy estimation unit is further configured to estimate the energy required to travel to the respective points on the travelable route from the current position of the host vehicle on the basis of travel route information along the travelable route.

3. The battery charging control device for an electric vehicle as defined in claim 1, wherein, the management area modification unit is configured such that, when the calculated battery energy management width is smaller than a management width lower limit value, the management area modification unit narrows the battery energy management area such that the calculated battery energy management width is larger than the management width lower limit value, and when the calculated battery energy management width is larger than a management width upper limit value, the management area modification unit widens the battery energy management area such that the calculated battery energy management width is smaller than the management width upper limit value.

4. The battery charging control device for an electric vehicle as defined in claim 1,
wherein the at least one controller further comprises:
a charging base determination unit configured to determine whether or not an external charging base exists in the battery energy management area;
a battery energy management area reduction unit configured to exclude an area farther from the current position of the host vehicle than a distance to the external charging area from the battery energy management area when the external charging base exists in the battery energy management area; and
a management upper limit value modification unit configured update the battery energy management upper limit value by calculating the battery energy management upper limit value anew on the basis of the battery energy management lower limit value.

5. The battery charging control device for an electric vehicle as defined in claim 4, wherein the management upper limit value modification unit is configured to calculate a value that is larger than the battery energy management lower limit value by a predetermined ratio as a new battery energy management upper limit value.

6. A battery charging control method for an electric vehicle, in which charging of a battery is controlled by controlling a power generation device installed in the electric vehicle, the method comprising, by use of at least one controller:

detecting a current position of a host vehicle;
setting a battery energy management area using the current position as a reference;
detecting at least one travelable route within the battery energy management area;
estimating energy values required to travel to respective points on the travelable route from the current position on the basis of information relating to the current position and information relating to the respective points;
extracting a maximum value and a minimum value from the required travel energy values;
calculating a battery energy management upper limit value and a battery energy management lower limit value on the basis of the maximum value and the minimum value of the required travel energy;
calculating a battery energy management width by subtracting the battery energy management lower limit value from the battery energy management upper limit value;
modifying the battery energy management area when the battery energy management width is not within a predetermined range such that the battery energy management width enters the predetermined range; and
controlling the vehicle-installed power generation device such that a remaining battery energy is within the battery energy management width between the battery energy management upper limit value and the battery energy management lower limit value.

* * * * *